(12) United States Patent
Bookbinder et al.

(10) Patent No.: US 11,714,038 B2
(45) Date of Patent: Aug. 1, 2023

(54) DEVICE AND METHOD FOR VISCOSITY DETERMINATION IN LIQUIDS

(71) Applicant: VISCGO LIMITED, Prestwich (GB)

(72) Inventors: Steven Bookbinder, Prestwich (GB); Elizabeth Boaden, Warrington (GB)

(73) Assignee: Viscgo Limited, Prestwich (GB)

( * ) Notice: Subject to any disclaimer, the term of this patent is extended or adjusted under 35 U.S.C. 154(b) by 0 days.

(21) Appl. No.: 17/341,723

(22) Filed: Jun. 8, 2021

(65) Prior Publication Data
US 2021/0310922 A1    Oct. 7, 2021

Related U.S. Application Data

(63) Continuation of application No. 16/070,881, filed on Jul. 18, 2018, now Pat. No. 11,029,238.

(51) Int. Cl.
  *G01N 11/10* (2006.01)
  *G01N 11/12* (2006.01)

(52) U.S. Cl.
  CPC ............. *G01N 11/12* (2013.01); *G01N 11/10* (2013.01)

(58) Field of Classification Search
  CPC .................................. G01N 11/10; G01N 11/12
  See application file for complete search history.

(56) References Cited

U.S. PATENT DOCUMENTS

2003/0073542 A1 *  4/2003  Patton .................. A63B 23/032
                                                    482/10

FOREIGN PATENT DOCUMENTS

| EP | 0660102 A1 | 6/1995 |
| GB | 751958 A | 7/1956 |
| JP | 1992-53452 A | 2/1992 |
| JP | 2007003437 A * | 1/2007 |

OTHER PUBLICATIONS

Machine translation of JP-2007003437 (Year: 2007).*
Atherton et al. Nutrition and Dietectics 2007; 64 (Supple. 2), 553-576. (Year: 2007).*

* cited by examiner

*Primary Examiner* — Nathaniel J Kolb
(74) *Attorney, Agent, or Firm* — Dentons Davis Brown; Matthew Wamer-Blankenship; Kassandra Ricklefs

(57) ABSTRACT

The present invention relates to a device for determining the correct viscosity of a liquid, comprising member which either remains in or assumes a substantially upright or pre-determined position when placed in a fluid having at least the desired or specified viscosity and is unable to remain in a substantially upright or pre-determined position if a fluid has less than the desired or specified viscosity. The invention also relates to methods and uses of particular devices and is particularly suited to assisting patients suffering from dysphasia (or similar conditions) and who wish to thicken liquids to enable them to allow safe swallowing without aspiration to take place.

16 Claims, 18 Drawing Sheets

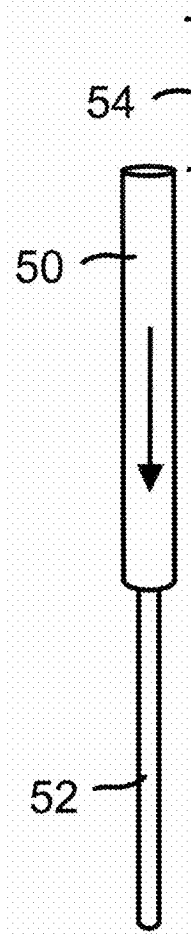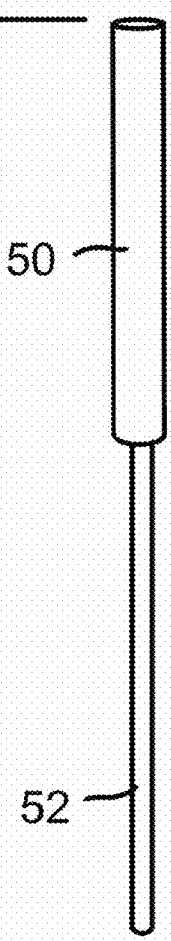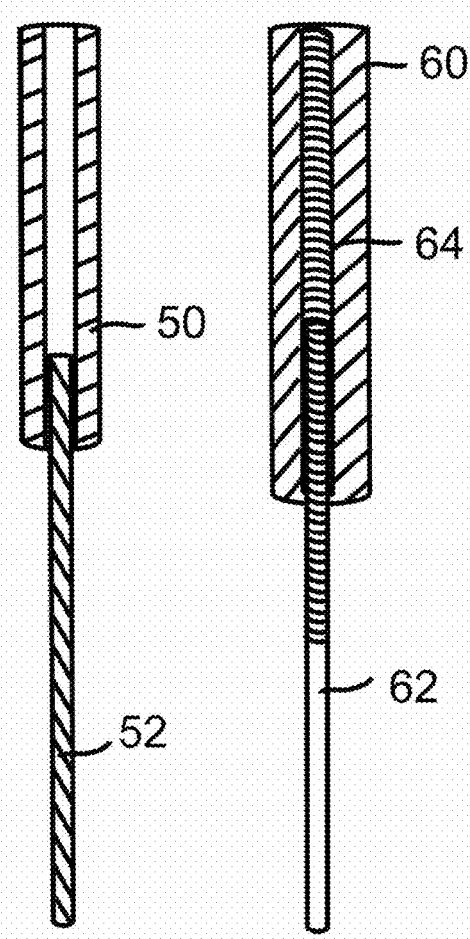
Fig.4    Fig.5

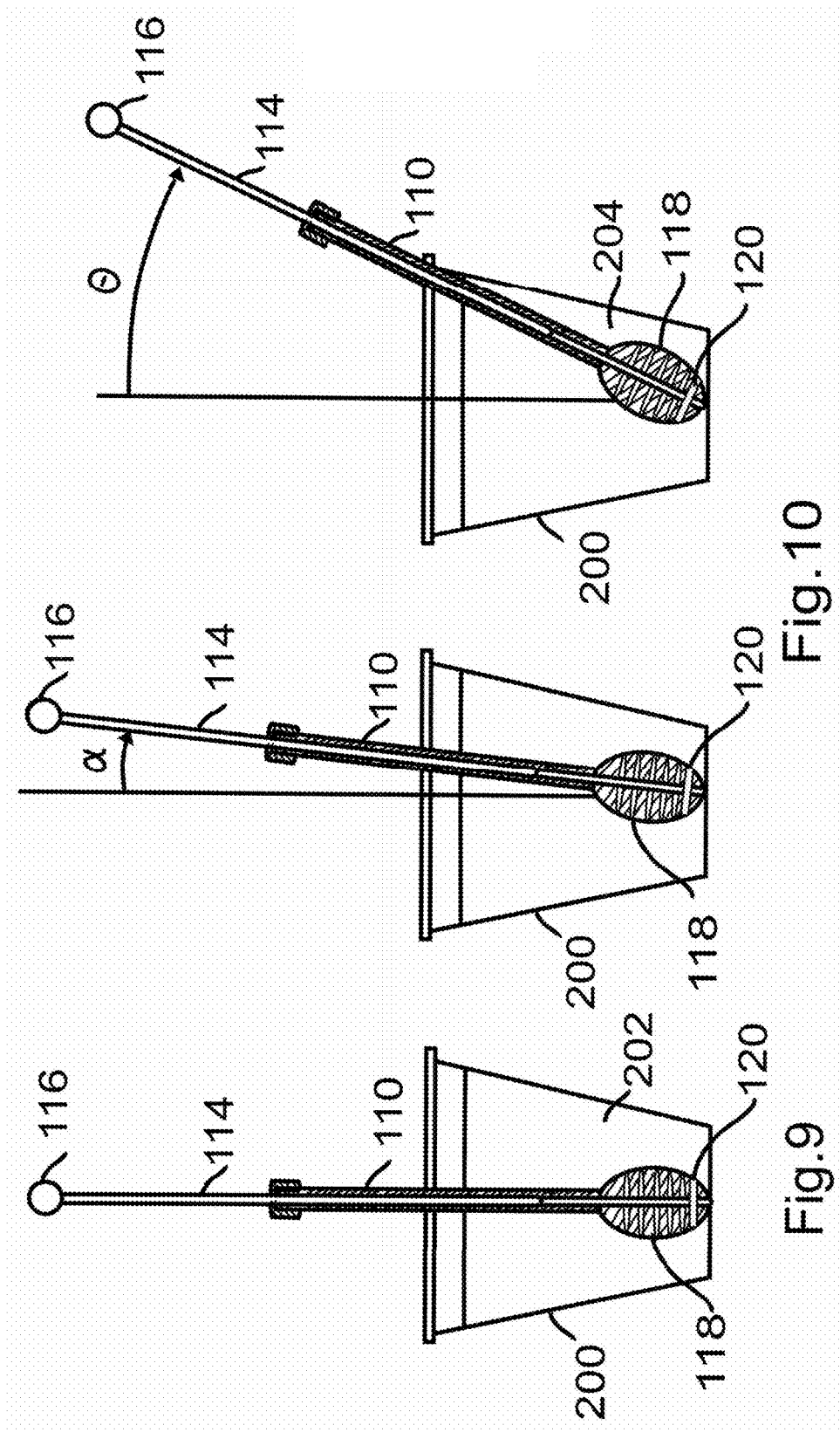

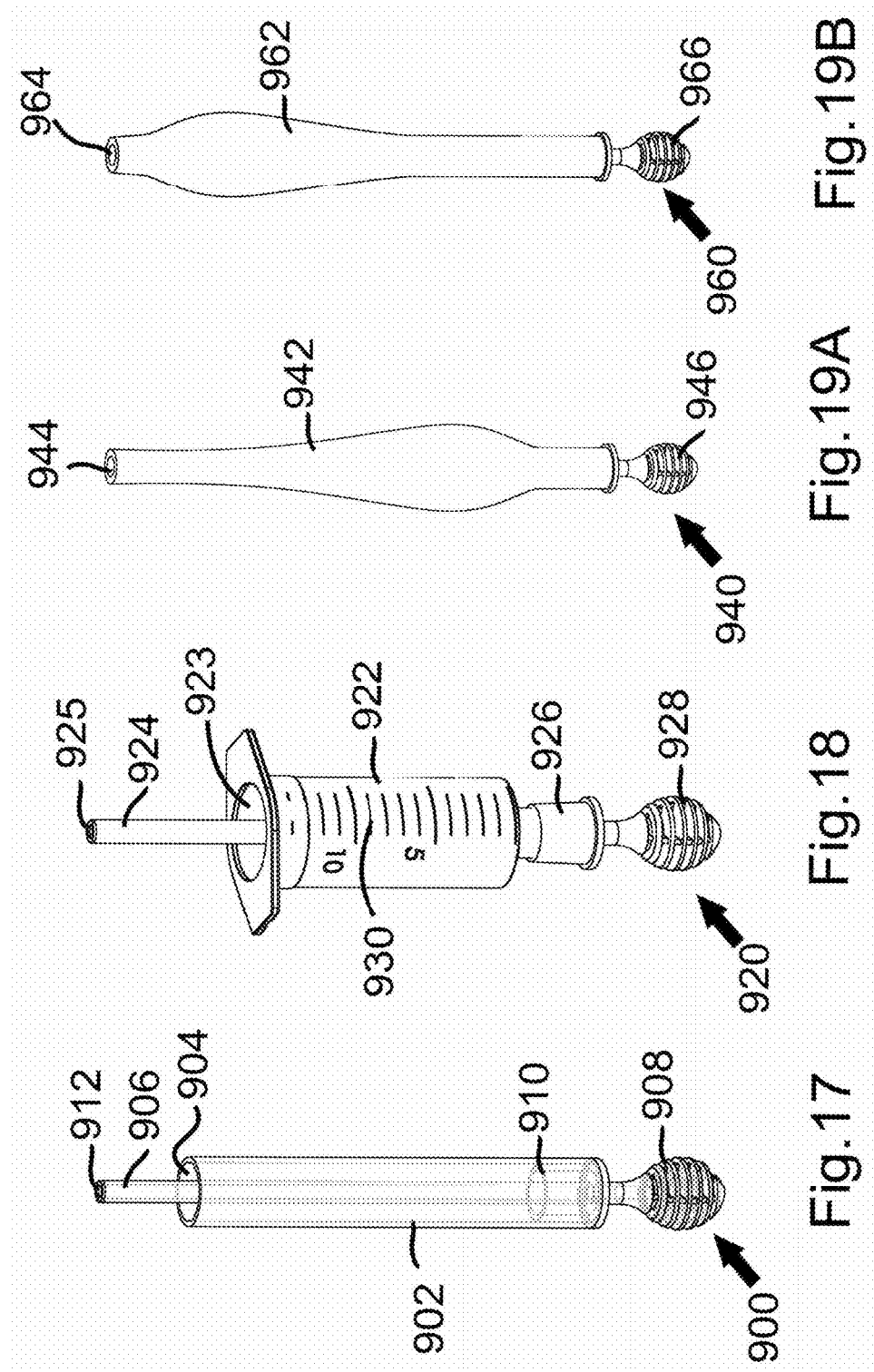

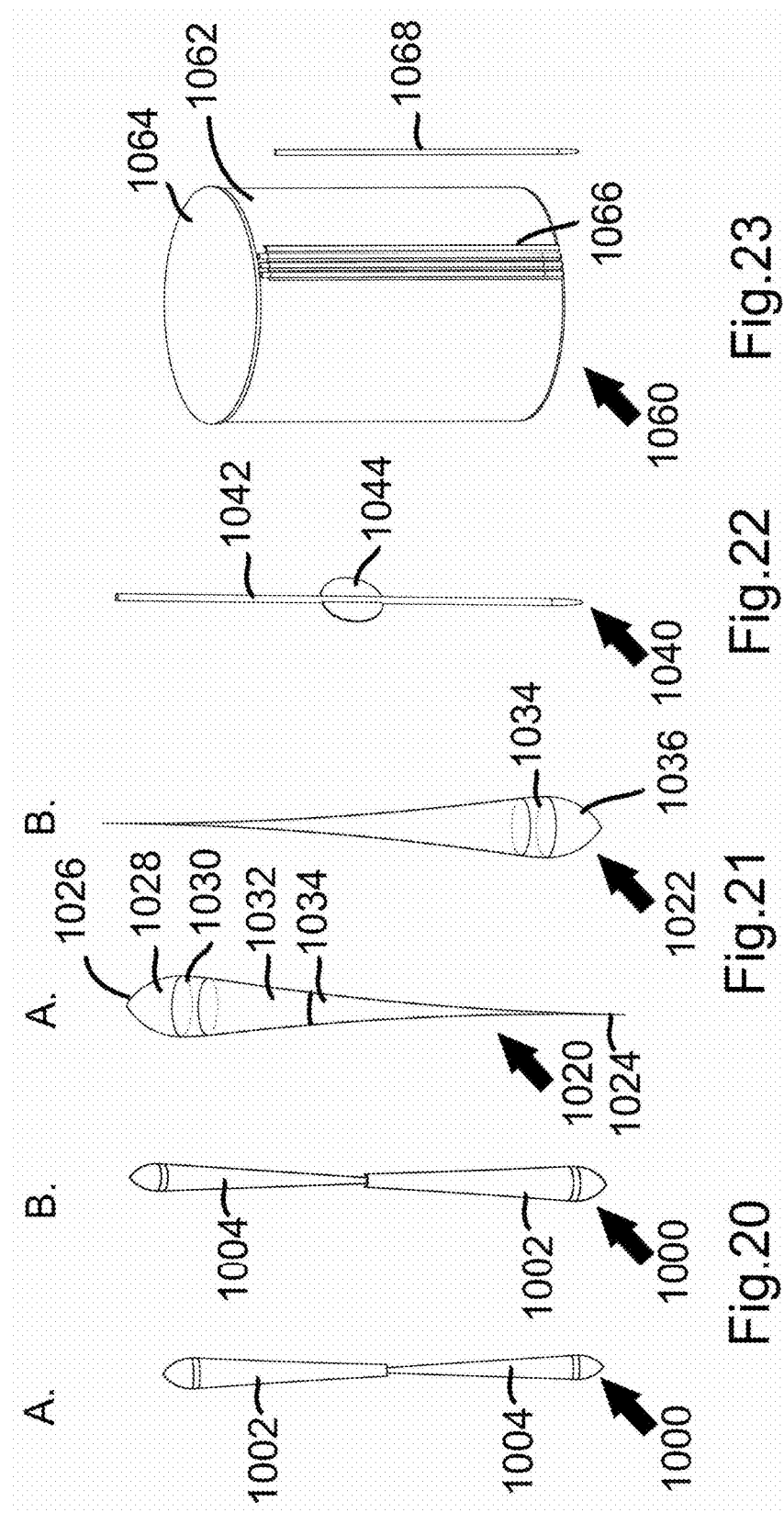

DEVICE AND METHOD FOR VISCOSITY DETERMINATION IN LIQUIDS

CROSS-REFERENCE TO RELATED APPLICATIONS

This application is a continuation of U.S. patent application Ser. No. 16/070,881, filed Jul. 18, 2018, and entitled "Device and Method for Viscosity Determination in Liquids," which claims priority to International PCT Application No. PCT/GB2017/050134, filed on Jan. 19, 2017, which claims the benefit of GB 1600960.7, filed Jan. 19, 2016, each of which is incorporated herein by reference in its entirety.

TECHNICAL FIELD OF THE INVENTION

The present invention relates to devices and methods for determining the correct viscosity of fluids, being particularly useful for, but not limited to assisting individuals suffering from dysphagia or similar medical issues, and associated medical professionals to establish the correct viscosity of fluids after or during thickening by a thickening agent.

BACKGROUND TO THE INVENTION

The thickening of fluids is a common practice, and for example is used in food production and the paint industry to name a few. A variety of measurement techniques, including use of rheometers, viscometers, gravity flow measurement, and other methods exist to enable accurate mixing and/or determination of thickness or viscosity to specific target specifications.

The term "fluid" is intended to mean any flowable material, including, but not limited to semi-solids, gels, emulsions, suspensions and creams. The term is also intended to encompass gaseous materials.

One particularly important area is the thickening of fluids for hospital drinks, where the target consumers are sufferers of Dysphagia. Dysphagia is a medical condition which manifests itself as a difficulty, disability or discomfort in swallowing. There are unfortunately, few treatments for the condition and frequently patients rely on adding various thickening agents to fluids to be consumed as these thickened fluids are more easily swallowed safely, without aspirating.

One of the main problems with using thickening agents to thicken a range of fluids, is correctly assessing the viscosity and/or rheology and/or thixotropic properties of the liquid after the thickening agent has been added to ensure that it is within the right parameters (to prevent dysphasic behaviour). Frequently, the amount of thickening agent needs to be precisely measured and added to a known quantity of liquid for the correct viscosity of the liquid to be established. Shear forces and rheological properties of the liquid are often hard to assess and this can result in patients attempting to ingest liquids which are not viscose enough and/or too viscose and subsequently experience problems with swallowing.

There have been recent advances in trying to standardise the addition of thickening agents and assessing the correct viscosities of liquids. The International Dysphagia Diet Standardisation Initiative (IDDSI) has proposed a standardised test using a syringe as syringes are commonly available throughout the medical industry. The IDDSI flow test relies on an individual removing the plunger from a syringe body and filling the syringe from the top to the 10 ml marker whilst putting a gloved finger over the nozzle to prevent the liquid from flowing out. The individual then removes their finger from the nozzle and assesses how much liquid has been dispensed from the syringe body within 10 seconds. Whilst this flow test is a step in the right direction for helping patients and medical workers establish the viscosity of a given liquid, it does have a number of problems associated with it. Firstly, syringes are made of different materials and manufacturing differences may result in nozzles differing in size and dimensions which can obviously effect flow rates of liquids from the syringe body and such nozzles can suffer blockages. Subjectivity is also incurred by bubbles or the surface tension of the meniscus of the liquid, which generally increases with increased liquid viscosity. The test also requires that the medical worker or patient has the dexterity to hold a syringe in one hand with one of their fingers covering the nozzle whilst pouring or pipetting/syringing samples of the liquid within the syringe body. If further thickening agents are required to be added to the liquid to increase the viscosity, this can also cause an issue if the sample has been thrown away as the initial volume of the liquid has been reduced and it is therefore difficult to assess how much additional thickener is required. Alternatively, if the liquid sample is placed back in the original liquid, contaminants could be introduced into the liquid to be consumed.

Other problems include the fact a new syringe has to be used each time to prevent liquids from previous testing to be introduced into the further tests and that the syringe test also does not compensate or enable easy retest. Retest is needed for temperature or time variation (resulting in settling or separation of fluid components (which are known to be influencing factors changing thickening properties of a pre-thickened fluid using the typical drink thickeners)).

The instructions provided with thickening agents often give guidance for specific volumes, for example 100 ml of liquid, however, they do not compensate for the removal of liquid through the IDDSI syringe test. Alternatively, additional liquid that may be introduced to thin the liquid would exhibit similar issues in inaccuracy and error. There is also the issue that this flow test requires at least two syringes, a vessel for collecting the tested liquids, preferably a rubber glove and some form of timing device which make regular testing time consuming and requiring one to have all the equipment to hand.

It is an objective of the present invention to alleviate one or more of the above identified problems associated with testing viscosity of liquids. It would be desirable if a device could be provided which can be easily manipulated, preferably with one hand and which can additionally quickly inform the medical worker or patient whether the liquid is at the correct viscosity. It would be additionally desirable for any such device to be able to discriminate between liquids of different viscosities or viscosities between particular ranges.

SUMMARY OF THE INVENTION

In accordance with the present invention, there is provided a device for determining the correct viscosity of a fluid, comprising an elongate member which remains in or assumes a substantially upright or pre-determined position when placed in a fluid having at least the desired viscosity and which is unable to remain in or assume a substantially upright or in the pre-determined position if the fluid has less than the desired viscosity.

To determine the fluid viscosity or thickness, the device may employ one or more physical attributes, for example, physical properties of the material from which the device is made. Other physical attributes such as shape, centre of gravity, density, surface area and texture may also be used for determining the correct viscosity of a fluid.

In certain embodiments of the present invention, the device may be capable of accurately measuring and/or monitoring its rate of displacement from a substantially upright or pre-determined position caused by gravitational forces acting on the device, when placed in a given fluid.

In other embodiments, the invention may also provide for the elongate member to be capable of identifying target specific fluid thickness or viscosity.

The device of the present invention therefore advantageously provides for a relatively simple and easy way to establish if the viscosity or thickness of a particular fluid is correct or within a specified/desired range. The present inventors have found such a device to be easily manipulated and a great improvement over and above the current prior art methods of establishing viscosities of fluids. Furthermore, the margin of error when using the present invention is greatly reduced over the prior art methods. In the case of medically thickened fluids, the device of the present invention would provide a faster, reusable, lower cost test methods that would result in the greater adherence to guidelines and regulation and in turn would lead to a decreased risk of dysphagia and associated conditions (such as pneumonia).

The elongate member may comprise an upper portion and a lower portion and wherein the lower portion is adapted to be placed into a fluid and the upper portion is adapted to be held and/or manipulated by the hand of an individual. Alternatively, the upper portion may be submerged in the fluid after insertion depending on the configuration and construction of the device. This enables two target measurements to be made by a single device which is formed as a single unit where the upper portion and lower portions may be integrally formed or operably connected to one another.

The device may be adjustable to select different desired viscosities or thicknesses. The device may further comprise a weighted element which can be added or removed, or alternatively permanently moved about the upper portion so as to adjust the viscosity at which it is able to remain in a substantially upright or pre-determined position. The weighted element may be moved along the longitudinal axis of the elongate member. Alternatively, the weighted element may comprise one or more weighted elements which extend outwardly from the upper portion so as to alter the centre of gravity of the elongate member.

In a related embodiment, the device may further comprise one or more weighted components which may be attached to the device either alone or in multiples so as to adjust the viscosity at which it is able to remain in a substantially upright or pre-determined position. The weighted component or multiple components may be formed as a removable feature, component, portion or part of the elongate member which could be removed or attached to enable variable and different target viscosities and thicknesses to be identified using the same device.

The elongate member could also be orientated or adjustable in different positions to enable different target thickness or viscosity measurements to be identified, using the differential physical effects that occur when the device is orientated at different angles or in different positions. The change behaviour of the member may be due to changes in shape or the centre of gravity. For the different positions, this can be determined using different angle variants.

In an alternative embodiment the device comprises one or more electronic or electromechanical sensors in the form of accelerometers or potentiometers so as to assess the movement of the device through the fluid. The movement could be invoked by placing the device in a substantially upright position and/or a predetermined position and allowing the device to move through the fluid due to gravitational forces acting on (or not as the case may be) the device. Alternatively, the device may comprise fluid flow sensors in the form of rheometers or viscometers and movement could be invoked by manually moving the device through the fluid by using, for example, a stirring or agitating action. The information from the sensor may be relayed to an indicator located on the device or to a remote device. The indicator could provide a specific measurement of the viscosity and thickness or provide an easy to read "yes"/"no" (or coloured) indicator. Should the information be relayed to a remote device, then the information may be transferred using wireless communication. Enabling the information to be relayed to a remote device confers a number of advantages, such as communicating the information to consultants and having the information logged and stored as legacy data.

The elongate member may comprise one or more interior channels running through at least part of its length, said channel being capable of receiving at least part of the length of a second elongate member and the second elongate member being adjustable within the channel so as to extend or shorten the length of the device so as to adjust the viscosity at which it is able to remain in a substantially upright or pre-determined position. The second elongate member will preferably be locatable within the interior channel through an aperture provided at the end of the upper portion of the elongate member. Alternatively, the second or first elongate member may be entirely removable for measuring alternative viscosity and thickness specifications or targets. In its simplest form, the interior channel could form a drinking straw, through which the liquid may be consumed.

The second elongate member may be held in position within in the interior channel and/or an aperture by a number of means, such as a friction fit or a friction collar, snap fit or other method to temporarily affix the members together. For example, alternatively, at least part of the interior channel and/or aperture may comprise a threaded surface which is operably disposed around a threaded shank portion of the second elongate member so as to enable an individual to twist one end of the device so as to alter its length. These fixing features could also be positioned externally on the device.

Furthermore, the secondary elongate member may comprise a weighted element or alternatively a number of elongate members provided to enable a number of target or specific viscosities or thicknesses to be assessed and identified with one device. These could work individually or in combination with one or more of the other members to help determine a targeted or specific thickness or viscosity.

If desired, the second elongate member may comprise a weighted element or a further element.

The device may further comprise markings which are indicative of adjustments that can be made which represent different desired viscosities so that an individual can adjust the device to enable the desired viscosity to be tested. Markings can also be introduced to determine liquid height levels which also affect the functioning of the device.

Advantageously, the elongate member can exhibit one or more other features aiding the thickening process, such as a stirrer, temperature measurement device or similar and this may be particularly important when the liquid has been thickened using a thickening agent (which may be in the form of a new powder which may coagulate or new liquid which exhibits resistance to mixing easily or even exhibits separation or where temperature alters the thickness or viscosity of the fluid, which is the case when agents are used in the hospital and health care environments). For the example of a stirrer, this would be in order to facilitate or assist in the mixing action, the lower portion may comprise a mixing element capable of mixing the liquid. Such a mixing element will be apparent to the skilled addressee but may comprise a fork, spoon, whisk, dipper (in the form of a honey dipper) or beater arrangement.

In an embodiment, the elongate member comprises a conduit running through its centre. In this embodiment, the conduit can be used to convey the liquid and therefore the device also used as a drinking straw.

In one embodiment of the present invention, the elongate member is unable to remain within a substantially upright or pre-determined position when placed in a liquid having the desired viscosity and the device comprises a further elongate member which is able to remain substantially upright or pre-determined position when placed in a liquid having the desired viscosity. The desired viscosity may comprise a viscosity within a range of 2 or more levels of viscosity. The elongate member may define the minimum (or alternatively maximum) desired viscosity and the further elongate member may define the maximum (or alternatively minimum) viscosity of the liquid. Therefore, by placing both elongate member and the further elongate member into a liquid, the user can easily identify whether the viscosity of the liquid is correct, if the further elongate member is substantially upright or pre-determined, and the further elongate member has fallen to the side of the container. Of course, it will be apparent to the skilled addresser that the elongate member and the further elongate member may be marked or coloured so that each member can be easily identified by the individual so they can confirm the correct configuration of both members which is indicative of the correct viscosity or viscosity range. Again, this could also be evident for more elongate members that may or may not be introduced. Such marking or colouring may be in-line with the IDDSI Colour Level as described below.

The maximum and minimum thicknesses could also be identified by movement of the weighted element to specified positions.

Embodiments of the device may be calibrated to assess and identify potentially any viscosity or thickness. It will be apparent to the skilled addressee that any selected viscosity or thickness levels, measurements or ranges can be targeted with the appropriate design variation. In certain embodiments of the invention, it is envisaged that the device will be calibrated to test that the viscosity of a liquid matches one of the International Dysphagia Diet Standardisation Initiative (IDDSI) Levels as described in Table 1 below. The skilled person will appreciate that the viscosity values may be subject to future change.

The device may be coloured (or its component parts) in accordance with the colour IDDSI has prescribed for the Level the device is testing, i.e. white for a device testing a liquid has a viscosity within Level 0, grey for a device testing a liquid has a viscosity within Level 1, purple for a device testing a liquid has a viscosity within Level 2, yellow for a device testing a liquid has a viscosity within Level 3 and green for a device testing a liquid has a viscosity within Level 4.

With reference to Table 1, the American Dietetic Association (now called the Academy of Nutrition and Dietetics) set the standards for the "National Dysphagia Diet: Standardization for Optimal Care" and provided the following liquid diet definitions:

Nectar Thick liquids: liquid coats and drips off a spoon like a lightly set gelatin. This consistency requires little more effort to drink than thin liquid. It is easier to control through the swallow than thin liquid and can flow through a straw or nipple. (Internationally known as "Slightly thick" or "1");

Honey Thick liquids: liquid thicker than "nectar thick" and flows off a spoon in a ribbon, like actual honey. This consistency allows for a more controlled swallow. This consistency is difficult to drink through a standard straw. (Internationally known as "Mildly thick" or "2"); and Pudding Thick liquids: liquid stays on a spoon in a soft mass but will not hold its shape. It pours slowly off a spoon and is sip-able. This consistency is difficult to draw though a wide-bore straw. (Internationally known as "Moderately thick and Liquidized" or "3").

With reference to the various embodiments of the present invention, the defined viscosities may be in the range of about 1 cP to about 50 cP, about 51 cP to about 350 cP, about 351 cP to about 1750 cP and over about 1751 cP. It will be appreciated by the skilled addressee that precise adherence to the viscosity values and ranges outlined above is not a necessity and other factors such as shear forces may need to be taken into consideration when adjusting the device or providing elements of the device for assessing the particular viscosity of a liquid. The device may also be adjusted or adapted so as to determine a bespoke or desired viscosity of a liquid which has been identified to be easier to swallow by a particular individual.

The further elongate member may be receivable within an interior channel located within the elongate member.

The elongate member and the further elongate member may be adapted so as to be connectable with one and another for ease of use, transportation or storage.

In a further embodiment of the present invention, the elongate member may be substantially hollow and comprise an aperture at one or both ends of the member.

In accordance with a further aspect of the present invention, there is provided a device for determining the correct viscosity of a fluid, comprising plurality of elongate members, each elongate member being able to remain in a substantially upright or in a pre-determined position when placed in a fluid having a pre-determined viscosity and which are unable to remain in a substantially upright or in pre-determined position when the fluid has less than the pre-determined viscosity, and wherein the plurality of elongate members correspond to different pre-determined viscosities. Furthermore, the elongate members could be made from one or a combination of shapes and materials which will enable optimisation for specific fluids and thicknesses.

TABLE 1

| IDDSI Level | Descriptor | IDDSI Colour | US National Dysphagia Diet | Viscosity cP |
|---|---|---|---|---|
| 0 | Thin | White | Thin | 1-50 |
| 1 | Slightly Thick | Grey | Nectar | 51-350 |
| 2 | Mildly Thick | Purple | Honey | 351-1750 |
| 3 | Moderately Thick | Yellow | Pudding | 1751 - upper limit unknown |
| 4 | Extremely Thick | Green | | Unknown |

Preferably, each of the plurality of elongate members has an indicator indicating pre-determined viscosity to which it relates.

In accordance with a yet further aspect of the invention, there is provided a device for determining the correct viscosity of a fluid, comprising an elongate member and one or more weighted attachments, wherein the elongate member is able to remain in or assume a substantially upright or pre-determined position when placed in a fluid having a pre-determined viscosity and which is unable to remain in or assume a substantially upright or pre-determined position when placed in a fluid having less than the pre-determined viscosity and wherein the one or more weighted attachments can be attached to the elongate member so as to enable the device to identify different pre-determined viscosities. The weighted attachment could be static or moved to different positions on the elongate member depending on the viscosity target desired.

Preferably the one or more weighted attachments are of different weights.

In accordance with yet a further aspect of the present invention, there is provided a device for determining the viscosity of a fluid comprising an elongate member, a motion and/or velocity sensor and/or proximity sensor located on or within the elongate member and a communication arrangement for communicating motion and/or velocity signal from the sensor to the user which is indicative of the viscosity of the fluid as it falls through the fluid of the fluid from a substantially upright or pre-determined position. This furthers capability of determination of more finite thickness ranges within the maximum and minimum target ranges.

Preferably, the communication arrangement may be linked to a visual display or to a device which indicates to the individual what the viscosity is and/or whether additional thickener or fluid need be added to the fluid. Also the communication arrangement may be able to communicate to or with a remote device or database or the display of a mobile or cellular phone. The device may also be adapted to enable one member to provide full viscosity or thickness ranges to be achieved within a single elongate member by measuring the rate of change of displacement through the fluid.

The advantage of an electronic digital feedback could enable specific weights (or mass/volume) of thickening agents to be determined from data received and communicated to the user.

In accordance with yet a further aspect of the present invention, there is provided a container or packaging for housing a powdered food stuff or medicament, where the container or packaging incorporates, additionally houses or is associated with a device as herein above described. The packaging could be in the form of single or multiuse packaging. An example of such packaging is where the packaging may contain the thickening or thinning agent, and the lid maybe designed to incorporate the measuring member. In another embodiment, the member may be provided as part of the main body of the packaging or even attached to the side of the packaging where a section, portion, feature, component of part of the packaging maybe separated to enable the target viscosity measurement.

Preferably, the thickening agent maybe powdered food stuff, gel, starch or even medicament. The device may be incorporated by being attached to an interior or exterior feature of the container or packaging or may simply be placed within it. The device may also be a part or section of the packaging itself, where the member is detachable from the packaging.

It will be apparent to the skilled addressee that the device as hereby described above can be used for a number of applications where it is desired that the viscosity of a fluid be tested or determined. It is most preferred, that the devices are for use of determining the correct viscosity of liquids for consumption or administration to patients suffering from dysphagia. Alternatively, the devices may be for use in determining the correct viscosity of liquids such as cake-mix, or baby milk—both of which are formed by adding liquid (such as water or milk) to the powdered product.

In accordance with yet a further aspect of the present invention, there is provided a method for determining the correct minimum viscosity or thickness of a fluid comprising the steps;
   (a) providing a device as herein above described which is capable of determining whether the fluid has at least the correct minimum viscosity or thickness;
   (b) inserting the device, in a substantially upright or pre-determined position, in a fluid whose viscosity or thickness is to be determined; and
   (c) determining whether the fluid has at least the correct minimum viscosity or thickness by ascertaining if the elongate member remains in a substantially upright or pre-determined position.

The device used in connection with the method for determining the correct viscosity of a fluid may be a device as herein above described.

In accordance with yet a further aspect of the present invention, there is provided a method for incorporating a calibration tool which will enable the incorporation of the current IDDSI flow test into the device. Therefore this aspect provides an elongate member which remains in or assumes a substantially upright or pre-determined position when placed in a fluid having at least the desired viscosity and which is unable to remain in or assume a substantially upright or pre-determined position if a fluid has less than the desired viscosity, wherein the elongate member is cylindrical with a restricted bottom opening and larger top opening. The elongate member which is cylindrical may be in the form of a syringe having similar or substantially the same properties as a syringe currently used in the proposed IDDSI syringe test.

It will be apparent to the skilled addressee that the present invention is not limited to assessing the viscosity or thickness of foodstuffs, but could also be applied to assessing the viscosities and thickness of a range of fluids and liquids.

BRIEF DESCRIPTION OF THE DRAWINGS

Embodiments of the present invention will now be described, by way of example only, with reference to the following examples and accompanying figures, in which:

FIG. 4 shows a side view of a fourth embodiment of the present invention where a shaft is located within a cylindrical collar and where A. shows that the shaft has been received by the majority of the collar so as to make a shortened elongate member, B. shows a configuration where the shaft has been only partially received by the collar in order to produce a lengthened elongate member, and C. is a cross-sectional view of the shaft being received inside the collar to form the elongate member of the present invention;

FIG. 5 shows a cross-sectional view of a fifth embodiment of the device in accordance with the present invention, whereby the collar receives at least part of the shaft by means of a complimentary threaded portion on the collar and shaft;

FIGS. 9 and 10 are cross-sectional views of the device as shown in FIG. 7B. in situ in a cup of liquid;

FIGS. 16A-16C show the device in differing configurations;

FIG. 17 shows a seventeenth embodiment of a device in accordance with the present invention used to test the viscosity of a liquid;

FIG. 18 shows an eighteenth embodiment of a device in accordance with the present invention used to test the viscosity of a liquid;

FIGS. 19A and 19B shows a nineteenth and twentieth embodiment of a device in accordance with the present invention used to test the viscosity of a liquid;

FIG. 20 shows a twenty first embodiment of a device in accordance with the present invention;

FIG. 21 shows a twenty second embodiment of a device in accordance with the present invention;

FIG. 22 shows a twenty third embodiment of a device in accordance with the present invention;

FIG. 23 shows a twenty fourth embodiment of a device in accordance with the present invention used in combination with a packaging unit;

DETAILED DESCRIPTION OF THE INVENTION

Figure 1:
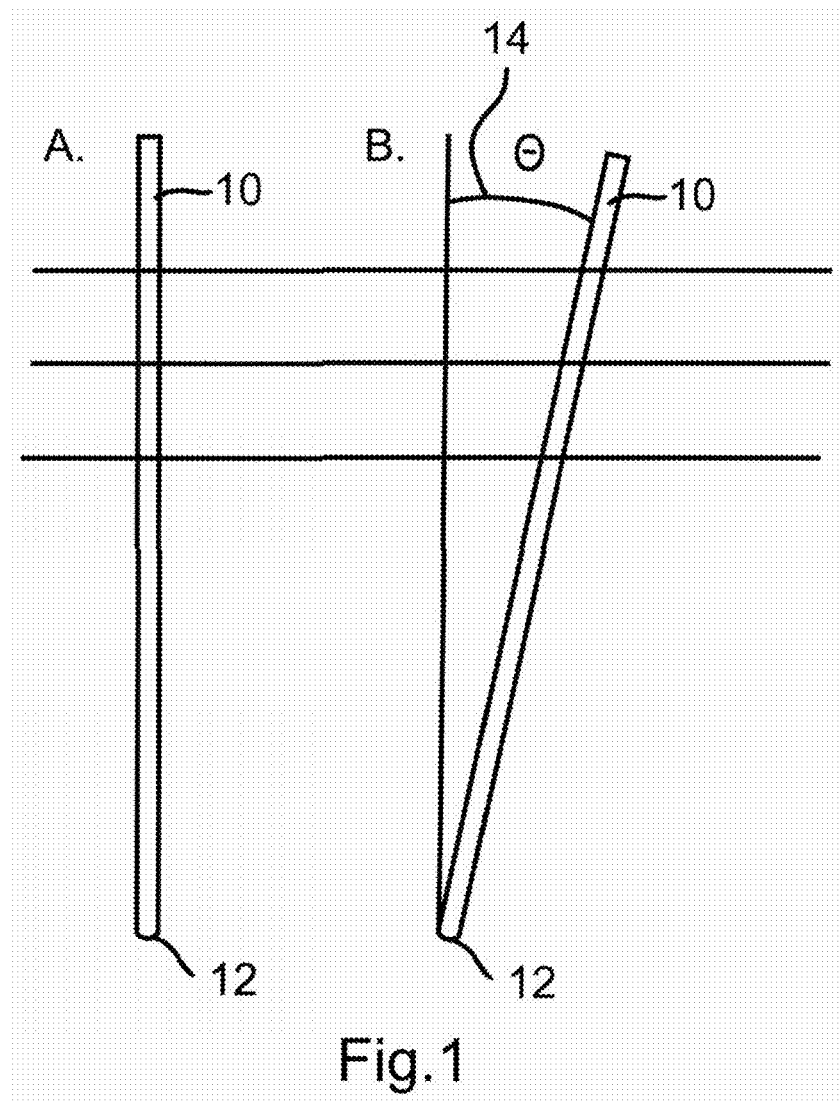
FIG. 1 shows a side view of a first embodiment of a device of the invention, where A. shows a single elongate member in an upright position and B. shows a single elongate member having an inclined position.

FIG. 1 shows the invention in its simplest form where it comprises an elongate shaft 10 which can be placed in a liquid having a given viscosity. The elongate member 10 has a rounded or pointed base 12 which is placed on the bottom of the receptacle (not shown) containing the liquid. When the elongate member 10 is placed in an upright or pre-determined position in the centre of the receptacle and the viscosity of the liquid is high enough, the elongate member will remain in an upright or pre-determined configuration as shown in FIG. 1A. however, should the elongate member be placed in a liquid having an insufficient viscosity, due to gravitational forces, it will move from a substantially upright or pre-determined position as shown in FIG. 1A. and assume an inclined position resting on the side of the receptacle as shown in FIG. 1B. at an inclined angle 14.

Figure 2:
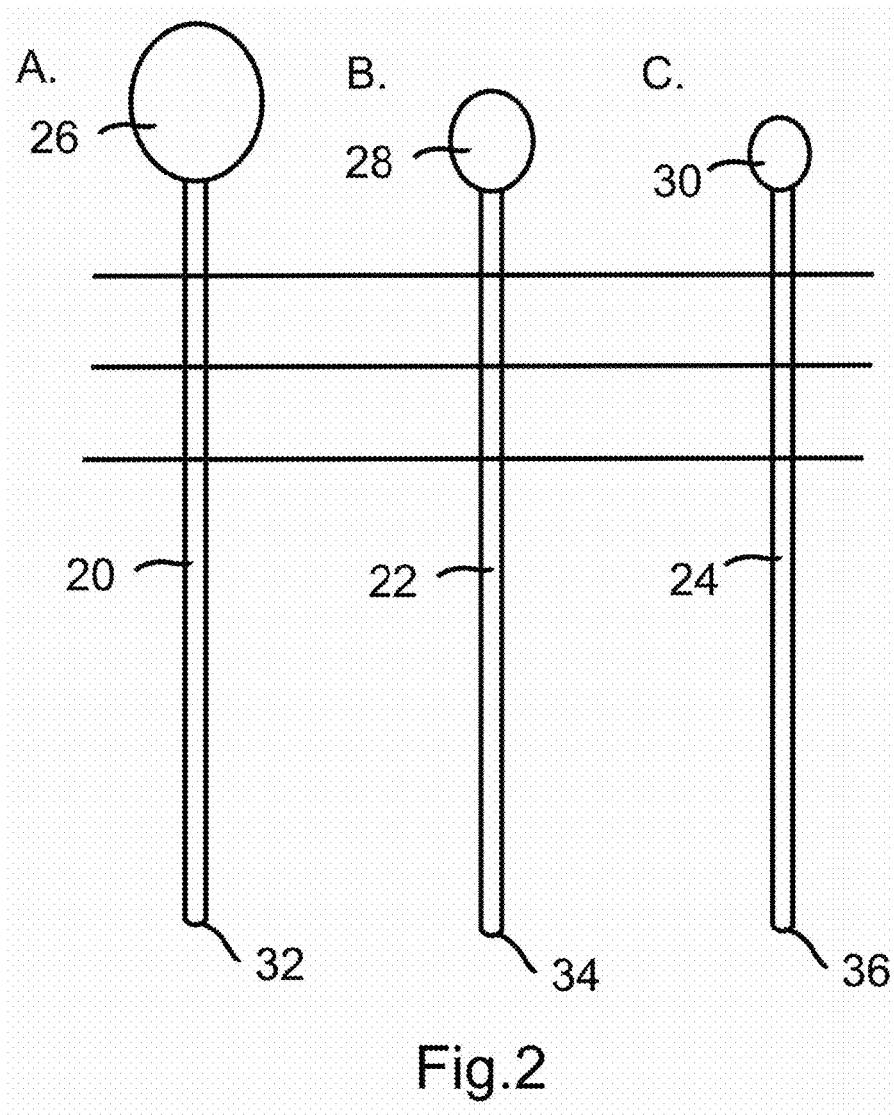
FIG. 2 shows a side view of a second embodiment of the present invention, where A. shows an elongate member with a large weight at the top of the elongate member, B. shows a medium weight at the top of an elongate member, and C. shows a small weight attached to the top of an elongate member.

With reference to FIG. 2 there is illustrated elongate members 20, 22, 24 FIG. 2A shows an elongate member 20 having a large weight 26 located towards the upper portion, the middle elongate member 22 has a medium size weight 28 located towards the upper portion, whereas the right-most elongate member 24 has a small weight 30 located towards its upper portion. Each of the elongate member 20, 22, 24 have lower ends which terminate in rounded or pointed portions 32, 34, 36. Collectively the elongate members 20, 22, 24 represent a set of elongate members each of which may be used to indicate liquids having different viscosities. For example, the elongate member of FIG. 2A may represent, and therefore remain substantially upright or pre-determined, when placed in a liquid which is deemed to be IDDSI Level 3 "moderately thick" or having a viscosity of over 1750 cP (this value will be altered or change in retrospect of the IDDSI values). Elongate member 22 shown in FIG. 2B may indicate a viscosity that is IDDSI Level 2 "mildy thick" and therefore will remain upright or pre-determined when placed in liquids having viscosity between 351-1750 cP (these values will be altered or change in retrospect of the IDDSI values). Lastly, elongate member 30 of FIG. 2C may denote a liquid which is IDDSI Level 1 "slightly thick" and therefore having a viscosity between the range of 51-350 cP (these values will be altered or change in retrospect of the IDDSI values) by remaining in a substantially upright or pre-determined position when placed in a liquid having a viscosity falling within this range.

Figure 3:
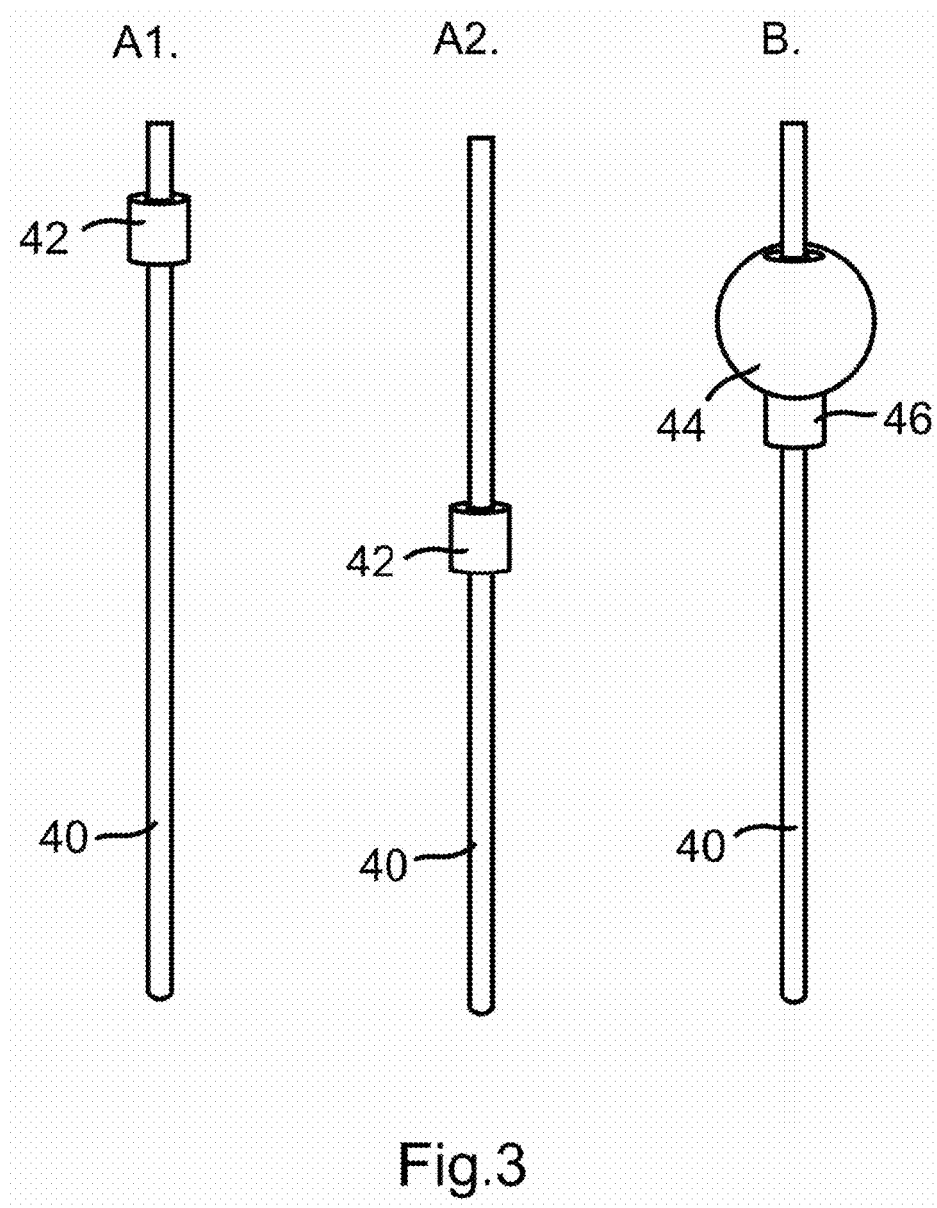
FIG. 3 shows a side view of a third embodiment of the present invention which includes a weight which is moveable along the length of the elongate member, where A1. shows a weight located about the axis of the elongate member where the weight is towards the top of the member, A2. shows the same weight as shown in FIG. 3A1. but where the weight is located towards a middle portion of the elongate member and B. shows an elongate member with a differently shaped weight and a friction collar disposed towards an upper portion of the elongate member.

With reference FIGS. 3A-3B there is shown an elongate member 40 similar to that shown in FIG. 1, with the addition of weighted collar disposed around the shank of the elongate member. In FIG. 3A1, the weighted collar is located towards the top of the elongated member, whereas in FIG. 3A2 the weighted collar is located towards the middle of the elongate member 40. The configuration of the weighted elements in FIG. 3A1 and FIG. 3A2 would result in a liquid having a higher viscosity being detected where the weighted element is towards the top of the shank as shown in FIG. 3A1 and when moved (or adjusted) to the middle of the elongate member 40 (as depicted in FIG. 3A2) would be able to detect a liquid having a lower viscosity. The viscosities of the liquids being detected and/or determined by the elongate member 40 being able to remain in a substantially upright or pre-determined position when placed in the liquid. FIG. 3B shows a further adaptation of the embodiment as shown in FIGS. 3A1 and 3A2, whereby a weighted element 44 is located around the shaft of elongate member 40, but a friction collar 46 is located on the underside of the weighted element 44 so as to prevent the weighted element 44 moving further down the shank unless required. If desired, markings (not shown) along the length of the shank of elongate member 40 could be provided indicating where the weight element 42, 44 need be placed so as to determine a particular viscosity of a liquid. There also could be more than one weighted element added to enable different viscosities to be targeted as depicted in FIG. 3B.

With reference to FIG. 4 there is an elongate member 50 which has a hollow cylindrical interior which can receive a shaft 52. By adjusting how far the shaft 52 is received inside the elongate member 50, the device can be extended or shortened as desired by distance 54 (as depicted by the arrows). By extending the shank 52, the length of the overall device is increased and therefore the device as shown in FIG. 4B would be able to detect liquids having a greater viscosity than that shown in FIG. 4A which would have a shorter overall length and therefore a shorter centre of gravity. This can be a friction fit, or even set snap/bump fits to ensure correct positioning.

With reference FIG. 5, there is shown an adaption of the device as shown in FIG. 4 whereby the elongate member 60 is able to receive an extendable shank 62 by rotating both parts relative to one another about the threaded portion 64 so as to extend or retract (by twisting either clockwise or anti-clockwise) so as to extend or shorten the device so as to adjust the centre of gravity of the device and enable it to determine different viscosities of different liquids.

Figure 6:
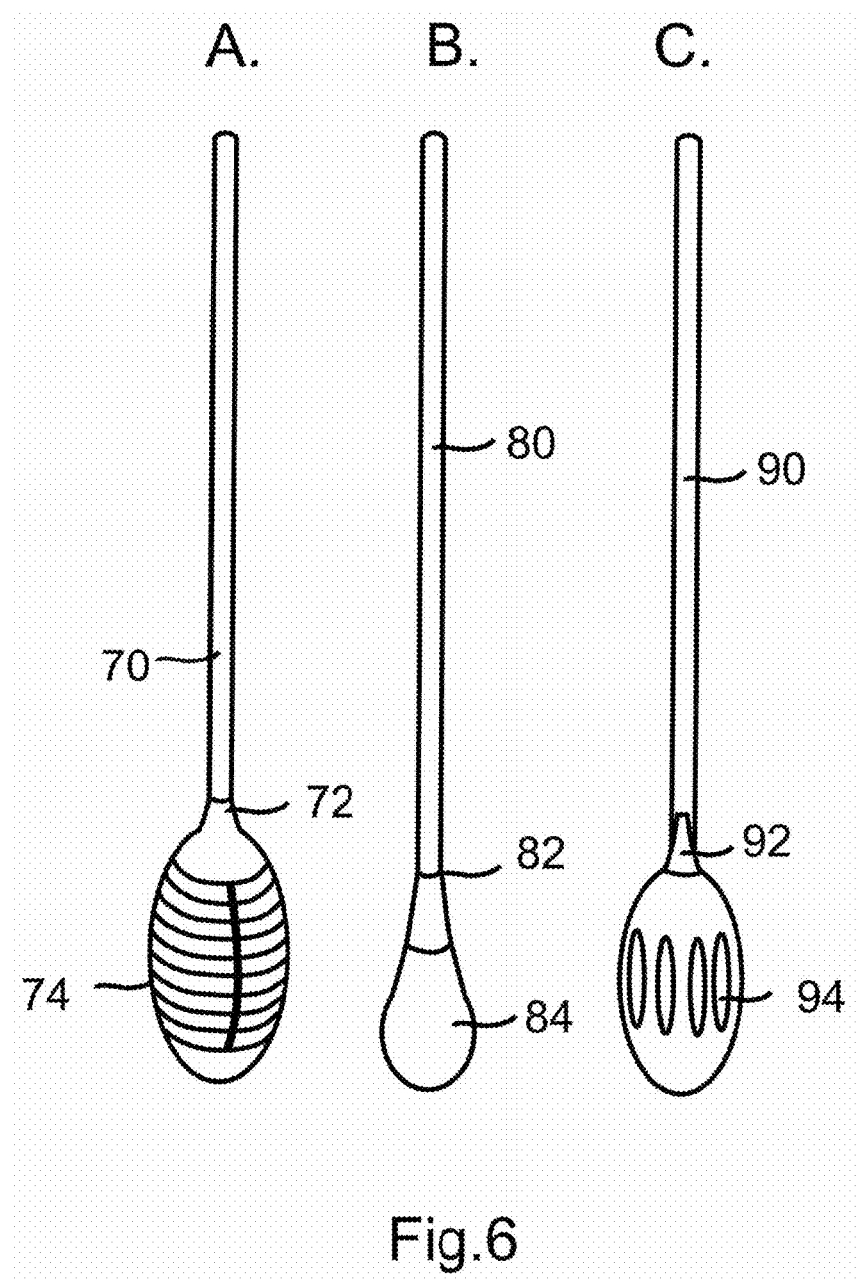
FIG. 6 shows a sixth embodiment of the invention in which A. shows the bottom portion on the elongate member terminating in a shaped stirring end, B. shows an elongate member whose lower portion terminates in a "bell" shaped stirring portion and C. shows an elongate member whose lower portion terminates with a porous spherical/ovoid hollow stirring portion.

With reference to FIG. 6A there is shown an elongate member 70 whose base 72 terminates in a stirring element 74 which is configured in a similar arrangement to that as a "honey dipper or other form". The elongate member 70 is used as not only a device for assessing the viscosity of a liquid, but also for assisting in the stirring action by having the stirring element 74 located towards the base 72.

We reference to FIG. 6B, there is a similar elongate member 80 as depicted in FIG. 6A, however, towards the base 82, there is located a simple shaped mixing element 84.

With reference to FIG. 6C, there is shown a further adaptation to the elongate members as illustrated in FIGS. 6A and 6B, whereby an elongate member 90 is provided which has a stirring element 94 located towards the base 92, wherein the stirring element 94 is in the shape of substantially spherical or ovoid shape with a plurality of holes disposed around the exterior and whose interior is hollow.

As an alternative (not shown), the lower portion could be configured in another form/shape, which could be to provider other functional advantages, such as optimising the manufacturing modification, improve stirring capability, or even the addition of secondary functions such as a food injection system, filter or pump.

Figure 7:
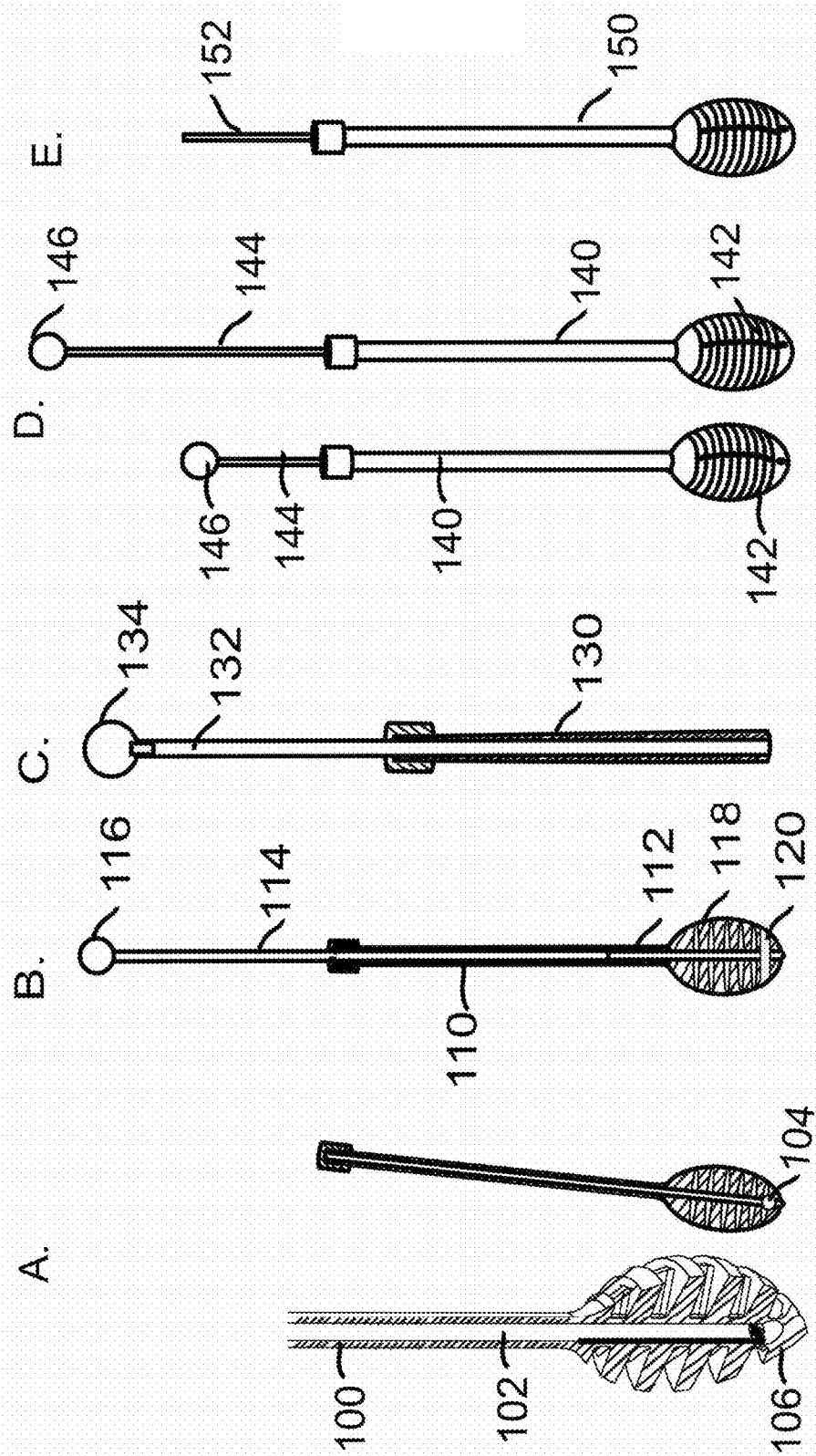
FIG. 7 shows a seventh embodiment of the device in accordance with the present invention, where A. is a cross-sectional view of a device having a hollow elongate member terminating in a "honey dipper" stirring element which also has the provision of an aperture towards the base of the stirrer, B. shows a similar elongate member as shown in FIG. 7A. but also having a shaft located towards an upper portion inserted within its interior, C. shows an enlarged view of the upper portion of the device shown in, B. D. shows a elongate member receiving a shaft having a weight located towards its upper portion and the elongate member terminating at a stirrer towards its base in the configuration of a "honey dipper" E. shows a similar embodiment as shown in D., but without the weight located at the upper portion of the shaft.

FIG. 7A shows a cross-sectional view of the elongate member which is similar to that in FIG. 6A, but additionally comprises a conduit 102 running through the centre of the member 100 and terminating with an aperture 104 towards the bottom of the stirring element 106. In FIG. 7B the elongate element 110 is shown having an inner channel 112 within which is received a shank 114 which has a weighted element 116 located at an upper portion in common with embodiment shown in FIG. 7A, the Figure shown in FIG. 7B also shows a mixing element 118 at its base and whose interior conduit 112 terminates in an aperture 120. With reference to FIG. 7C, there is shown an enlarged view of the upper portion of the device shown in FIG. 7B, but without the mixing element. In FIG. 7B, the shank 132 which terminates in a weighted element 134 is shown to be able to move within the interior of the elongate member so as to adjust the centre of gravity to therefore allow the device to detect different viscosities. FIG. 7D shows the elongate member 140 as depicted in FIG. 7B, rather than an aperture being provided at the base of the stirring element, the end of elongate member 140 is not open and the stirring element 142 is simply attached to the lower section of the elongate member and the shank 144 which is weighted 146 is received within the top of the elongate member 140 so as to adjust the overall height of the device and thus adjust the overall centre of gravity so that liquids having different viscosities can be tested. FIG. 7E shows an elongate member as shown in FIG. 7D, although the shank 152 does not have a weighted element but can be adjusted in a similar manner so as to adjust the centre of gravity so as to allow the device to test liquids having different viscosities. The insert may be height adjusted to vary weights. The elongate member may be provided with markings (not shown) to which the insert can be set, hence a target viscosity can be chosen within maximum and minimum limits of the insert adjustment. The feature at the top of the elongate member (shown at the top of the member numbered 110 in 7B) is used to control friction or fixing.

Figure 8:
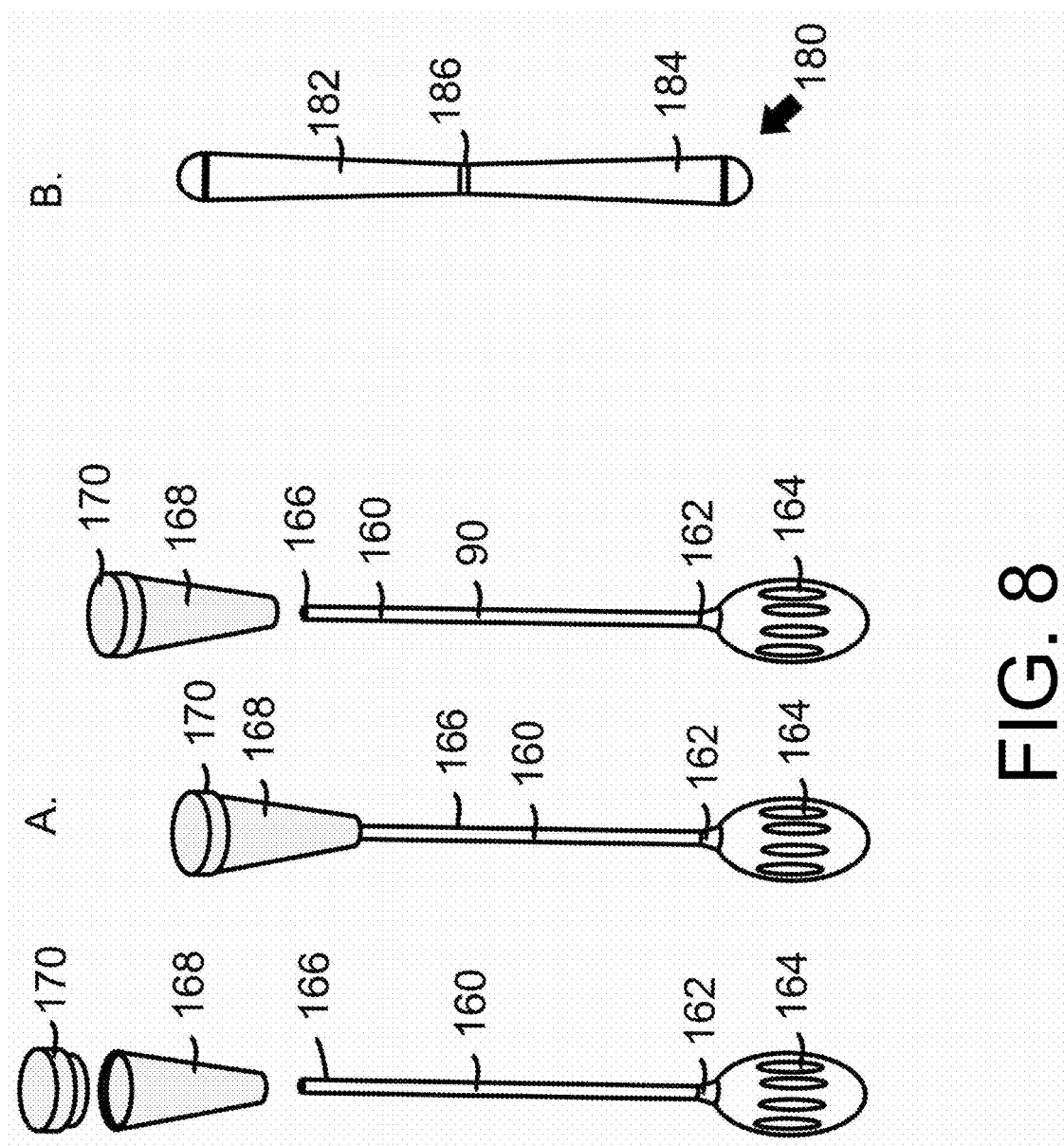
FIG. 8 shows the eighth and ninth embodiments of the device in accordance with the present invention where: A. shows an elongate member terminating in a stirring element and having a handle towards the upper portion with a screw top which act as weights; and which can be used to store foods, medicines or thickener agents.

With reference to FIG. 8A, there is shown a device comprising an elongate member 160 which terminates at a lower portion 162 in a mixing element 164 having a generally spherical or ovoid shape having a plurality of apertures disposed around the exterior surface and whose structure is overall hollow. Towards the upper portion 166 the elongate member 160 there is a frustoconical portion 168 forming a cavity which has a removable threaded lid 170. Together, the frustoconical portion 168 and removable threaded lid 170 form a container which can be used to store food stuffs, medicines, thickening agents, powders or other ingredients, substances or components (not shown) that maybe added to the liquid/fluid being tested.

With reference to FIG. 8B there is provided an elongated device 180 having an upper portion 182 and a lower portion 184. The upper and lower portions 182 and 184 are adapted to be of different weights or adapted so as to produce a different centres of gravity depending on which end is first placed in a liquid. In this manner, the device 180 can be used to assess two different viscosities depending upon whether the upper portion or lower portion is first placed in a liquid.

With reference FIGS. 9 and 10, there is shown the eighth embodiment as depicted in FIG. 7B, where the device is placed in a cup 200 containing a liquid 202 of a known volume and/or depth. In FIG. 9, elongate member 110 has been placed in an upright or pre-determined position within a liquid 202 having a certain viscosity. As the viscosity of the liquid 202 is at the desired level (or higher) the elongate member stays in a substantially upright or pre-determined position. However shown in FIG. 10, the viscosity of the liquid 204 is less than the desired amount and therefore the elongate member 110 is no longer able to remain in a substantially upright or pre-determined position.

Figure 11:
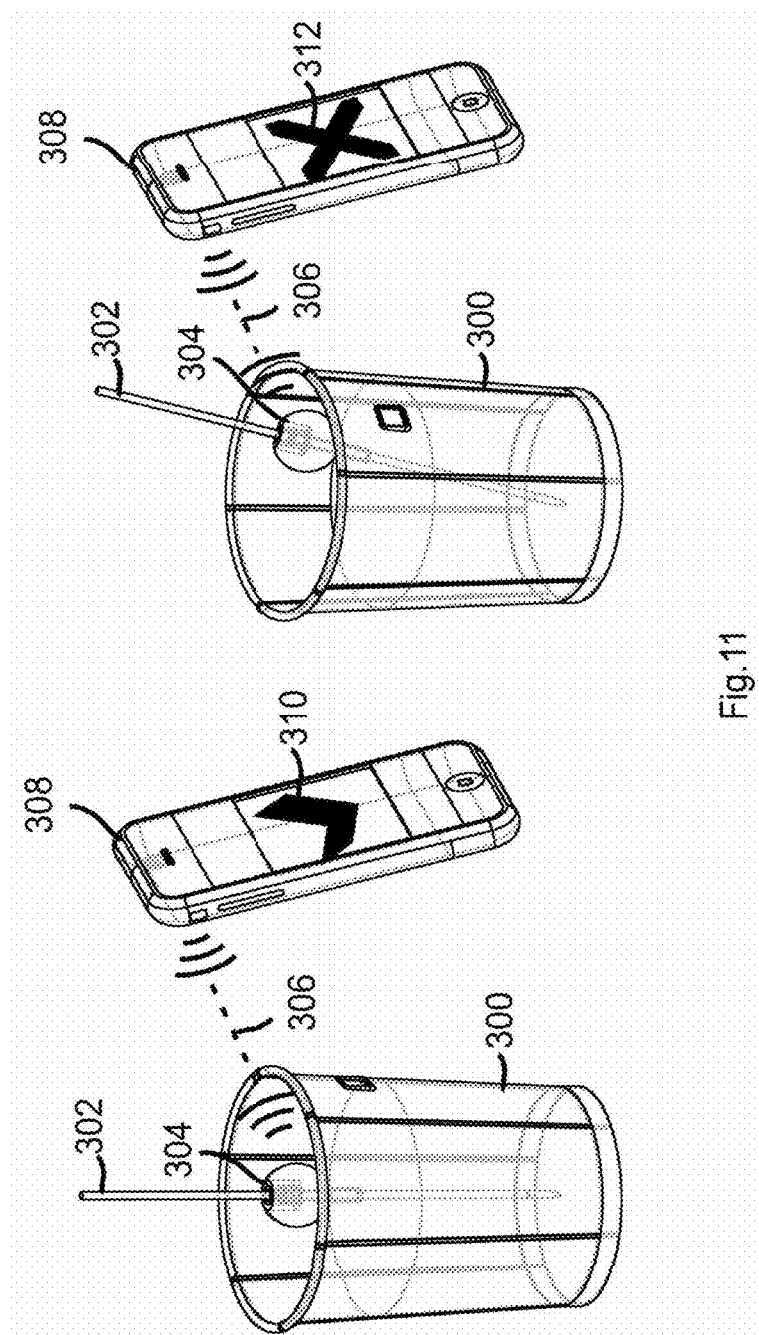
FIG. 11 shows a schematic diagram of a tenth embodiment of a device according to the present invention which is capable of communicating wirelessly with a cellular phone.

With reference to FIG. 11 there is a schematic diagram of a device for testing the viscosity of a liquid which is able to communicate with a mobile phone. A container 300 contains a liquid with a viscosity which is less than the desired value. The elongate member 302 is similar in construction to those shown in FIG. 3B and has a weighted element 304 adjusted to the required height. A motion and/or velocity sensor (not shown) is able to communicate 306 with a mobile phone 308 and when the elongate member 302 is in a substantially upright or pre-determined position, a positive sign 310 is displayed on the mobile phone 308. In the case that the elongate member 302 is unable to remain in a substantially upright or pre-determined position, the motion and/or velocity sensor sends a signal 306 to the mobile phone 308 so as to display a negative signal indicating to the user that the liquid is not at the required viscosity. Additionally or alternatively, the device as depicted in FIG. 11 may be configured so that the elongate member 302 is intended to be unable to remain in a substantially upright or pre-determined position so that the rate of motion and/or velocity through the fluid can be measured by one or more sensors (not shown) and the viscosity is subsequently communicated 306 with a mobile phone 308 and when the desired viscosity is attained, a positive sign 310 is displayed on the mobile phone 308. FIG. 11 shows the elongate member being monitored by a mobile phone camera, however, other methods of data transition from wired to wireless could be incorporated to provide similar data transfer functionality.

FIG. 12A shows an eleventh embodiment of the invention, whereby the motion and/or velocity sensor and communication device is located within a bell-shaped mixing portion of a device similar to that illustrated in FIG. 6B.

Figure 12:
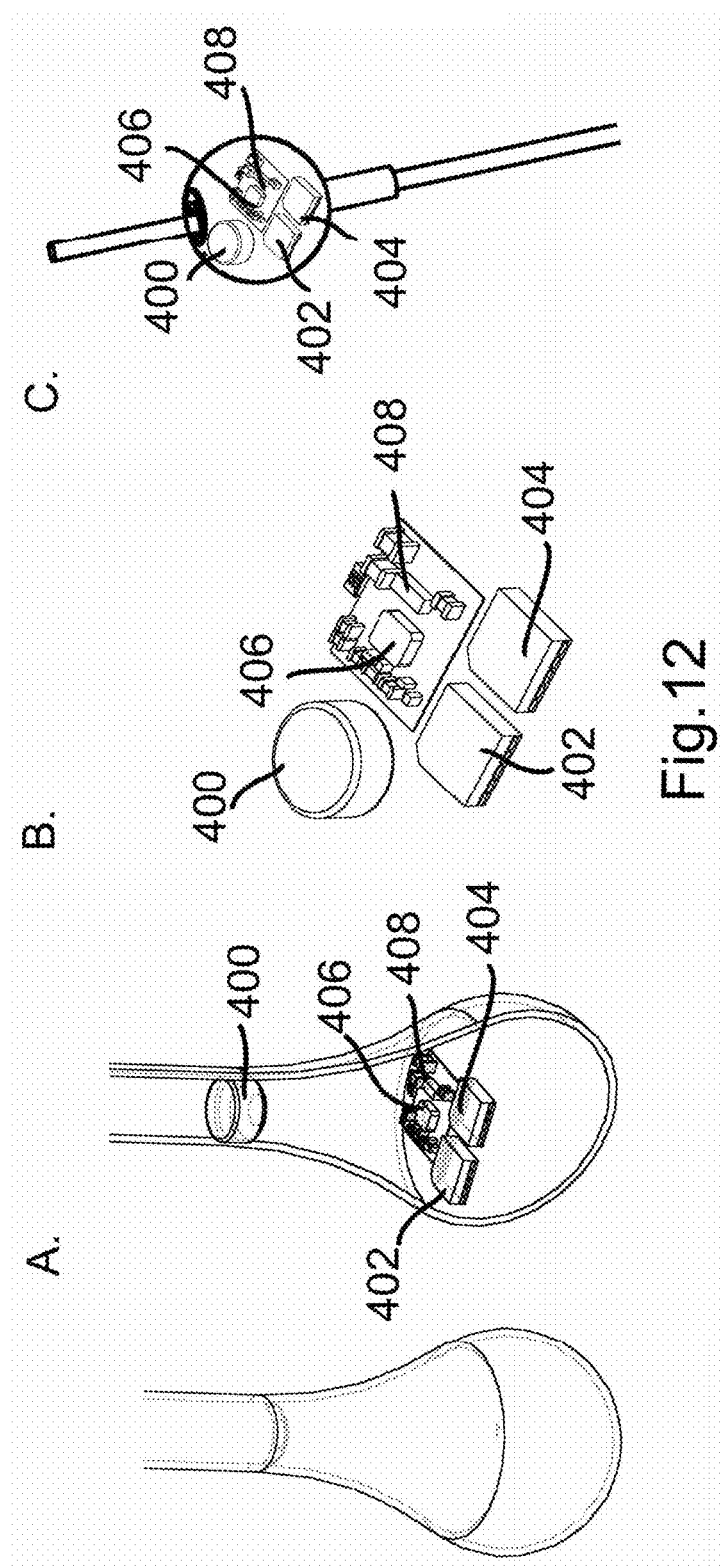
FIG. 12 shows cross-sectional views of eleventh and twelfth embodiments of a device according to the present invention which includes electronic sensors used to detect velocity and/or motion.

FIG. 12B shows the various components in the electronic sensor and in particular a battery 400 for powering the electronics, microprocessors 402, 404 for a motion sensor 406 and a velocity sensor 408. FIG. 12 shows that the sensors, circuitry and power source shown in FIG. 12B may be housed alternatively in a weighted element (such as that shown in FIG. 3B). Alternatively, the electronics assembly could incorporate a connector or wireless component.

Figure 13:
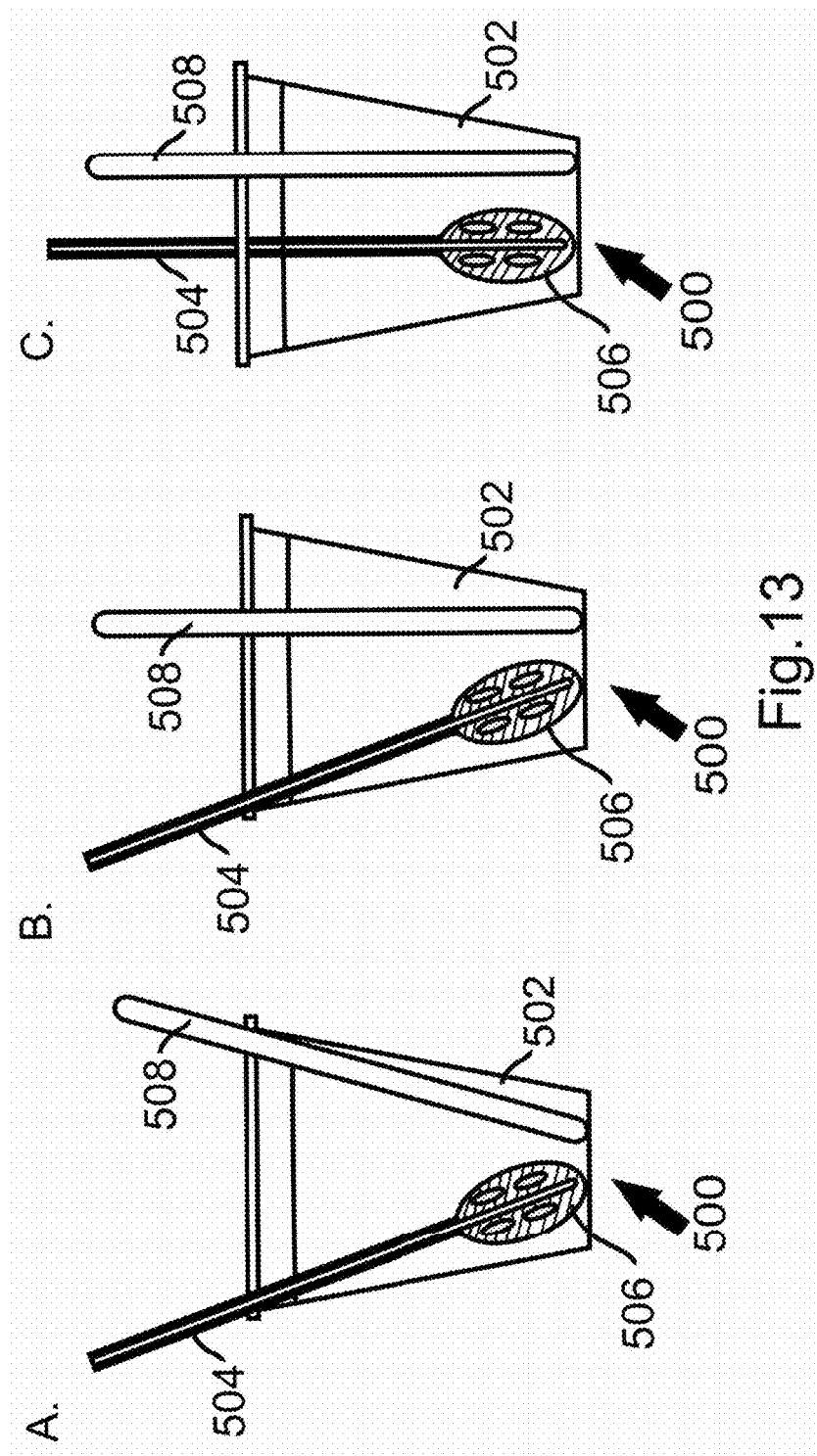
FIG. 13 shows a thirteenth embodiment of a device in accordance with the present invention used to test the viscosity of a liquid in a vessel that is below the minimum desired viscosity (A), at the desired viscosity (B) and above the desired viscosity (C)

FIGS. 13A-C shows the embodiment of the invention being used to test the viscosity of liquid in a container. Shown is a container 500 having a known volume/depth of liquid 502. Inserted into the container 500 is a first elongate member 504 which terminates with a stirring element 506. Also inserted into the container 500 is a second elongate member 508. The first elongate member 504 and second elongate member 508 are separated and both placed upright or at pre-determined positions in the liquid to be tested. If both the first elongate member and second elongate member fall (as shown in FIG. 13A), the liquid is less viscose than it should be. If the first elongate member falls but the second elongate member remains substantially upright or at the pre-determined position (as shown in 13B), the liquid is at the correct viscosity. If both the first elongate member and the second elongate member remain in a substantially upright or pre-determined position (as shown 13C), the liquid is more viscose than it should be. If desired, the first elongate member 504 and second elongate member 508 need not be placed in the liquid at the same time, but could be placed in the liquid independently of one another or in a sequential manner.

Figure 14:
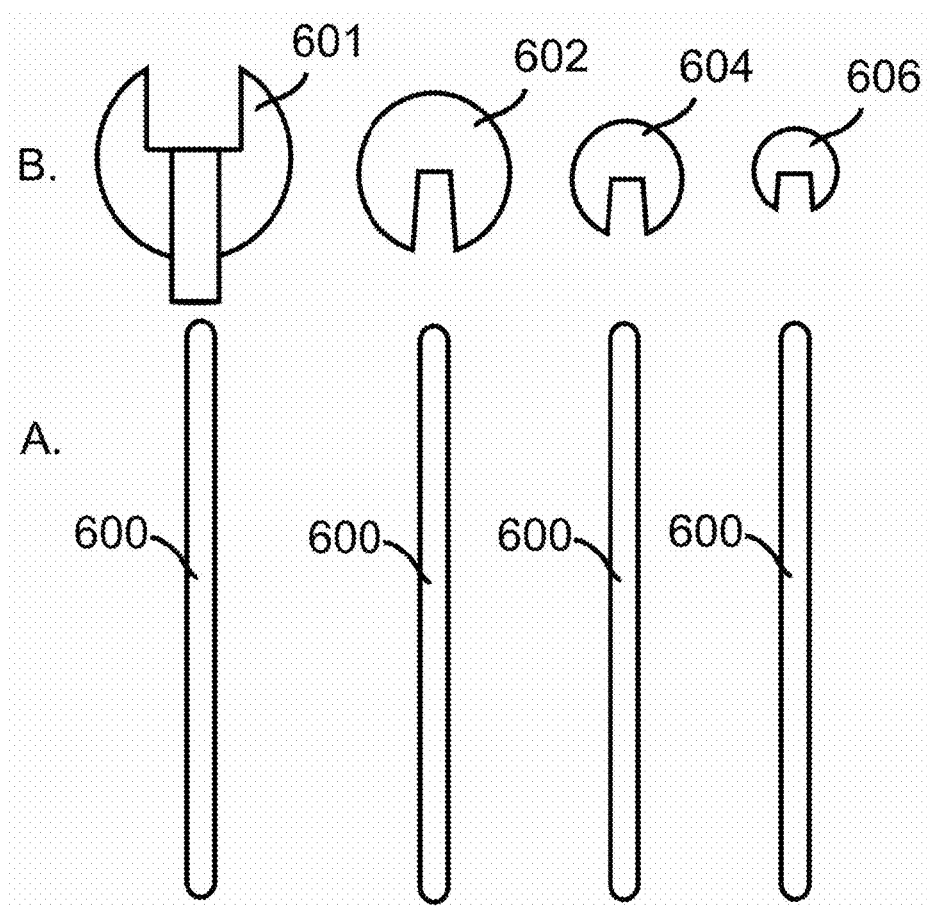
FIG. 14 shows a fourteenth embodiment of the device in accordance with the present invention, A. shows a number of elongate members having B. a number of differently sized and weighted elements and C. the elongate member having four differently sized weighted elements located on the top of the elongate member.
Figure 14:
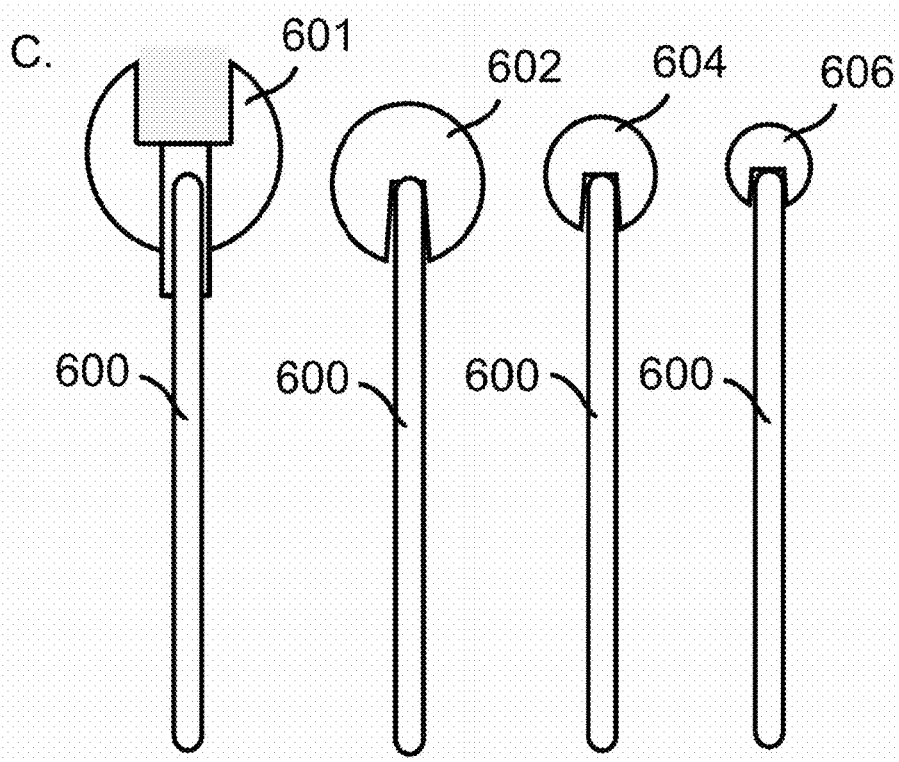

With reference to FIG. 14A, there is shown four identically dimensioned elongate members 600 which are able to accommodate a number of differently sized tops shown in FIG. 14B. The tops shown in FIG. 14B comprise a very large heavy top 601 (coloured for example in green), a large heavy top 602 (coloured for example in yellow), medium top 604 (coloured for example in purple) and a small light top 606 (coloured for example in grey). The tops, 601, 602, 604, 606 are interchangeable with and receivable on the end of the elongate member 600 and therefore permit the alteration of the centre of gravity of the elongate member which will provide an indication as to the viscosity of a fluid to be assessed. FIG. 14C shows the elongate members 600 with the tops 601, 602, 604, 606 placed on the end. In use, the elongate member 600 is coloured, for example in white and when placed in an upright position in fluid having a viscosity of over 1 cP it will remain upright denoting that the liquid is "thin" on a dysphagia scale. When the elongate member 600 has the small light top 606 on the end (as shown in FIG. 14C) and when placed in an upright position in fluid having a viscosity of over 51 cP it will remain upright denoting that the liquid is "slightly thick" or "Nectar" on a dysphagia scale. When the elongate member 600 has the medium top 604 on the end (as shown in FIG. 14C) and when placed in an upright position in fluid having a viscosity of over 351 cP it will remain upright denoting that the liquid is "mildly thick" or "Honey" on a dysphagia scale. When the elongate member 600 has the large heavy top 602 on the end (as shown in FIG. 14C) and when placed in an upright position in fluid having a viscosity of over 1751 cP it will remain upright denoting that the liquid is "moderately thick" or "Pudding" on a dysphagia scale. When the elongate member 600 has the very large heavy top 601 on the end (as shown in FIG. 14C) and when placed in an upright position in fluid having a viscosity of over, say, 2000 cP it will remain upright denoting that the liquid is "extremely thick" on a dysphagia scale. As the colour of the elongate member and/or tops relate to dysphagia scale commonly used, then the user can easily attach a top (or not as the case may be) so as to easily adjust the device to assess and indicate the correct viscosity of a liquid. Furthermore, the different tops can be used for assessing whether the fluid is within a range. For example, the small light top 606 can be used before the medium top 604 to see if the fluid has a viscosity within the range of 51 to 350 cP. Tolerances exist in the above viscosity levels.

Figure 15:
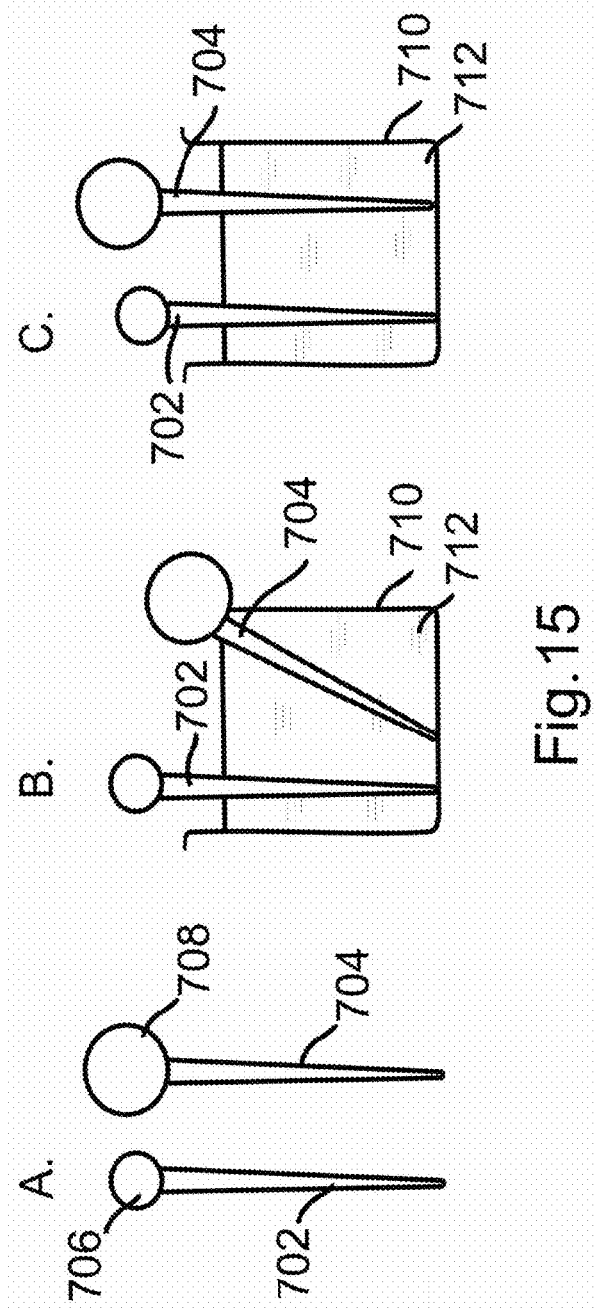
FIG. 15 shows a fifteenth embodiment of a device in accordance with the present invention used to test the viscosity of a liquid in a vessel, A. shows two elongate members having different weighted ends, B. shows the two elongate members placed in a liquid having the desired viscosity, C. shows the two elongate members placed in a liquid having a higher than desired viscosity.

With reference to FIG. 15A, there are shown a first elongate member 702 having a small weight 706 located at its top end and a second elongate member 704 having a large weight 708 located at its top end. FIGS. 15B-C show the first and second elongate members 702,704 being used to test the viscosity of two different liquids 712 in a container 710. The container 710 has a known volume/depth of liquid 712. Inserted into the container 710 is the first elongate member 702 and the second elongate member 704. The first elongate member 702 and second elongate member 704 are separated and both placed upright or at pre-determined positions in the liquid to be tested. If the second elongate member 704 falls but the first elongate member 702 remains substantially upright or at the pre-determined position (as shown in 15B), the liquid is at the correct viscosity. However, if both the first elongate member 702 and the second elongate member 704 remain in a substantially upright or pre-determined position (as shown 15C), the liquid is more viscose than it should be. If desired, the first elongate member 702 and second elongate member 704 need not be placed in the liquid at the same time, but could be placed in the liquid independently of one another or in a sequential manner.

Figure 16:
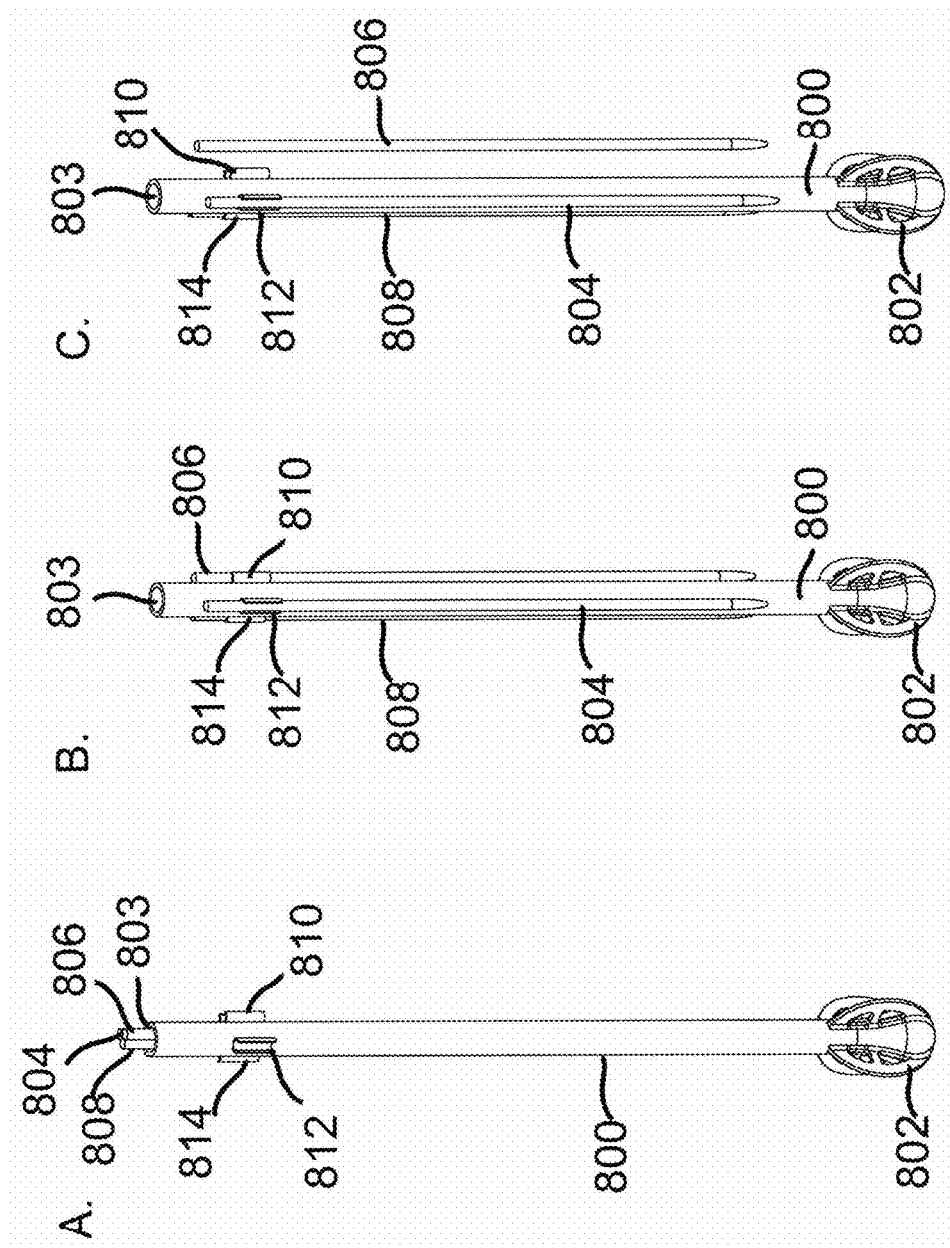
FIG. 16 shows a sixteenth embodiment of a device in accordance with the present invention used to test the viscosity of a liquid.

Referring now to FIGS. 16A-16C, there is shown an elongate member 800 in the form of a cylindrical member having a lower end terminating in a bulbous four paddled stirring element 802. The upper end terminates with an opening 803 to an elongate cavity extending down substantially the longitudinal length of the member 800. Around the exterior of the elongate member 800, towards the upper end, are three equally spaced outwardly facing "C" shaped grips 810, 812, 814. The grips 810, 812, 814 are able to hold three individual elongate weights 804, 806, 808 by means of a clip and/or friction.

The three elongate weights 804, 806, 808 may all be placed through the opening 803 so as to be received and held in the elongate cavity as shown in FIG. 16A. In FIG. 16B, all three elongate weights 804, 806, 808 are shown to be located within the grips 810, 812, 814. Lastly, FIG. 16C shows that only two elongate weights 806 and 808 are being held in grips 812 and 814, whereas one elongate weight 806 has been removed from the clip 810. In use, the location of the elongate weights can be varied so as to vary the centre of gravity of the member 800 when placed in a liquid. Varying the centre of gravity, enables the user to adapt the member 800 to assess a liquid for a particular viscosity. For example, the configuration shown in FIG. 16A results in a higher centre of gravity and so can be used to test for less viscose liquids, whereas the configuration shown in FIG. 16B results in a lower centre of gravity and so can be used to test for more viscose liquids. The configuration shown FIG. 16C provides for a member having an intermediate centre of gravity and therefore can be used to test the viscosity of liquids between the higher and lower viscosities being identified by the configurations shown in FIGS. 16A and 16B. The stirring element 802 enables the member 800 to be used not only to test the viscosity of a liquid but also help to stir the liquid (including any gelling or thickening agents which may have been added to the liquid). Each member could also be used individually (as shown in FIG. 1), and also weighted differently for different thickness targets.

With reference to FIG. 17, there is shown an elongate member 900 in the form of a hollow cylindrical member 902 having a lower end terminating in a bulbous porous stirring element 908. The upper end terminates with an opening 904 leading to an elongate cavity extending the longitudinal length of the member 902. Disposed within the cavity is a plunging element 910 which can be lifted so as to suck up liquid through the porous stirring element 908 and into the cavity. The plunging element 910 has an aperture in the middle which engages with a straw element 906 which is used by the user to pull or push the plunging element up and down within the cavity. The user can stir the liquid whose viscosity is being tested by means of agitating the member 902 within the liquid so that the stirring element helps to stir the liquid. When ready for testing, the user places a finger over the open top end 912 of the straw element 906 and then lifts the straw element 906 upwardly so as to enable the plunging element 910 to move upwardly through the cavity. As the plunging element moves upwardly, the liquid is sucked up through the porous stirring element and into the cavity. When the plunging element reaches a pre-defined height (not shown) which corresponds to a certain volume of liquid, the user releases their finger from the open top end 912 of the straw element 906 and in doing so releases the pressure holding the liquid within the cavity and the user can then measure the length of time taken for the liquid to flow out from the elongate member in a similar way as the current 'syringe test'. The same can be achieved with placing the finger over 904 (if the internal member is removed), or even another hole (exit hole) (not shown), at the bottom of 902.

With reference to FIG. 18, there is shown an elongate member 920 in the form of a hollow cylindrical syringe body 922 having a lower end terminating in a bulbous porous stirring element 928. The upper end terminates with an opening 923 leading to an elongate cavity extending the longitudinal length of the syringe body 922. Disposed within the cavity is a plunging element (or indeed combined with the straw 924) which can be lifted so as to suck up liquid through the porous stirring element 928 and into the cavity of the syringe body 922. The plunging element has an aperture in the middle which engages with a straw element 924 which is used by the user to pull or push the plunging element up and down within the body of the syringe. The user can stir the liquid whose viscosity is being tested by means of agitating the syringe 922 within the liquid so that the stirring element helps to stir the liquid. When ready for testing, the user places a finger over the open top end 925 of the straw element 924 and then lifts the straw element 924 upwardly so as to enable the plunging element to move upwardly through the cavity. As the plunging element moves upwardly, the liquid is sucked up through the porous stirring element and into the body of the syringe. When the plunging element reaches a pre-defined height as indicated on the scale 930 located on the exterior of the syringe body 922 which corresponds to a certain volume of liquid, the user releases their finger from the open top end 925 of the straw element 924 and in doing so releases the pressure holding the liquid within the cavity and the user can measure the length of time taken for the liquid to flow out from the elongate member in a similar way as the current 'syringe test', but that the straw element 924 reduces the need for multiple syringes to assess the flow rate (and therefore in turn the viscosity) of the liquid. This embodiment also has the added benefit of being compatible with the current viscosity tests currently being employed recommended by practitioners as it includes a syringe which can be filled to a certain level and the flow of liquid from the syringe body timed.

With reference to FIGS. 19A and 19B, there are provided devices 940 and 960 comprising hollow members 942 and 962 both of which terminate with bulbous porous stirring elements 946 and 966. The hollow member 942 shown in FIG. 19A has a slight bulge towards the lower portion of the member, whereas the hollow member 962 has a slight bulge towards the upper portion of the member. These devices have different centres of gravity depending on whether the bulge is located towards the upper portion (as depicted in FIG. 19B) or lower portion (as depicted in FIG. 19A). Therefore, the device shown in FIG. 19A would be suitable for assessing liquids having lower viscosities due to the lower centre of gravity, whereas the device shown in FIG. 19B would be more suited for assessing liquids having higher viscosities due to the higher centre of gravity. As the hollow members 942,962 terminate in a porous stirrer 946, 966, then both devices can additionally be utilised as a straw or container for other substances.

FIG. 20 shows a device 1000 which can be used to test two pre-defined viscosities of a liquid. The device 1000 is elongate in shape and has a first end 1002 and a second end 1004. The first end 1002 is wider and heavier than the second end 1004. In use, the device 1000 can be used to assess two different minimum levels of viscosity or thickness depending on the orientation of the device. In FIG. 20A, the first end 1002 is at the top and the second end 1004 is at the bottom. As the centre of gravity is higher in this configuration, the device can be used to assess a liquid having a higher viscosity or thickness. In FIG. 20B, the second end 1004 is at the top and the first end 1002 is at the bottom. As the centre of gravity is lower in this configuration, the device can be used to assess a liquid having a lower viscosity or thickness.

FIG. 21A shows a device 1020 which is an adaptation of earlier embodiments, but is used to determine the correct viscosity of a gaseous fluid. The device 1020 has a bulbous upper end 1026 which slowly tapers downwardly a pointed lower end 1024. The exterior of the device 1020 is of a thin and light material, such as foil, and the interior is formed of a number of sealed cavities 1028, 1030, 1032, 1034 extending from the upper end 1026 towards the lower end 1024. One or more of the sealed cavities 1028, 1030, 1032, 1034 may be filed with a quantity of gas of a specific molecular weight. When the device 1020 is placed in a gaseous fluid, depending upon the quantity and molecular weight of the gas within one or more of the sealed cavities 1028, 1030, 1032, 1034, the device will remain in or assume a substantially upright or pre-determined position when placed in a gaseous fluid having at least the desired viscosity.

The device 1022 shown in FIG. 21B, is similar in construction to the device 1020 shown in FIG. 21A, but is in an inverted configuration and only has a two sealed cavities 1034 and 1036. In this configuration, when the device 1022 is placed in a gaseous fluid, depending upon the quantity and molecular weight of the gas within one or both of the two sealed cavities 1034 and 1036, the device will remain in or assume a substantially upright or pre-determined position when placed in a gaseous fluid having at least the desired viscosity. As the centre of gravity of device 1020 is higher than that of device 1022, it can be used to assess higher viscosity gaseous fluids.

FIG. 22 shows a device 1040 which is a modification of the elongate member 10 shown in FIG. 1. The device 1040 is formed of an elongate member 1042. Extending from a centrally located portion are two opposing semi-circular portions 1044.

FIG. 23 shows a combination 1060 of a container 1062 and a plurality of elongate members 1068. The container 1062 is generally of a cylindrical constriction having a circular lid 1064. Around a portion of the exterior of the container 1062, are a number of elongated clips 1066 which are used to hold a number of elongate members 1068. In use, the container, 1062 can be used to accommodate a liquid thickening product and the one or more elongate members can be removed and placed in the thickened liquid to assess whether it has the desired (viscosity as one would with say the elongate member shown in FIG. 1). In an adaptation of the combination 1060 shown in FIG. 23, the elongate members 1068 may be integrally formed with the container 1062 or its lit 1064 and each elongate member is detachable or removable when required. In the alternative, the container 1062 may in fact form a drinking vessel and the vessel has a one or more detachable elongate members 1068 associated with it.

Figure 24:
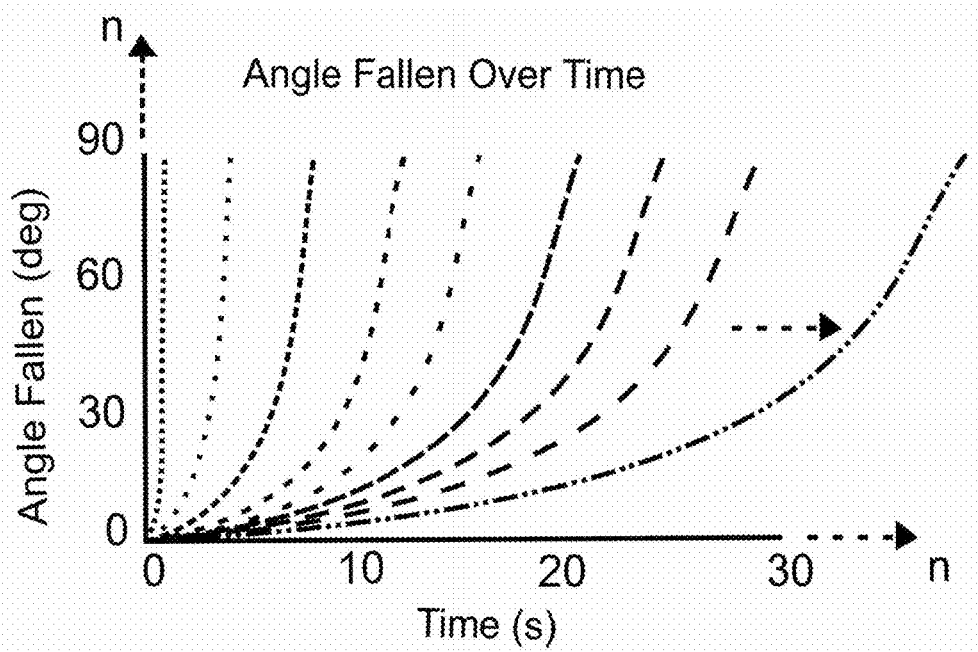
FIG. 24 shows a graph plotting the angle of fall over time of a device when placed in liquids of different viscosities or thicknesses.
Figure 25:
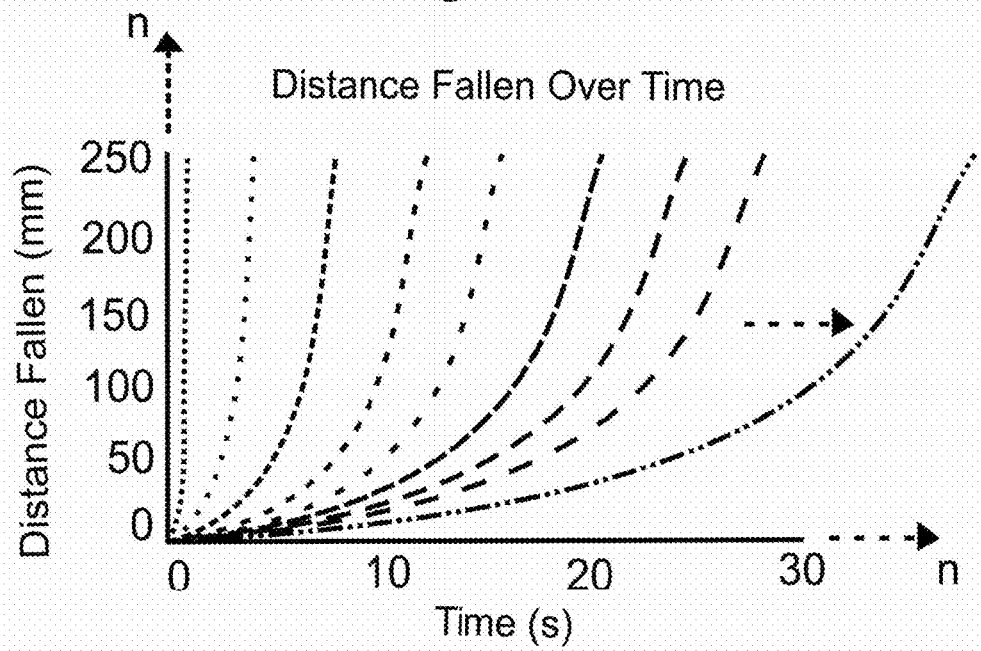
FIG. 25 shows a graph plotting distance of fall over time of a device when placed in liquids of different viscosities or thicknesses.

FIG. 24 shows a graph plotting the angle of fall over time and of a device when placed in liquids of different viscosities or thicknesses, whereas FIG. 25 shows a graph plotting distance of fall over time of a device when placed in liquids of different viscosities or thicknesses. These differences can be exploited in to assess or design devices for determining the correct viscosity of a fluid.

The forgoing embodiments are not intended to limit the scope of the protection afforded by the claims, but rather to describe examples of how the invention may be put into practice.

The invention claimed is:

1. A device for determining the correct viscosity of a fluid, comprising an elongate member which remains in an upright or assumes a pre-determined position when placed in a fluid having at least the desired viscosity and which is unable to remain in an upright or assume a pre-determined position if the fluid has less than the desired viscosity, wherein the elongate member remains in an upright or assumes a pre-determined position when placed, for a predetermined duration of time, in a fluid having at least the desired viscosity; wherein the device comprises one or more markings indicative of an upper and lower height of the liquid so as to enable the correct functioning of the device.

2. The device of claim 1, wherein the fluid is assessed as having at least the desired viscosity when the elongate member assumes a pre-determined position or moves to the pre-determined position.

3. The device of claim 2, wherein the pre-determined duration of time taken for the elongate member to either remain in an upright or move to the pre-determined position is 10 seconds or less.

4. The device as claimed in claim 1, wherein the desired viscosity is a first desired viscosity, and wherein the device comprises a second elongate member which is able to remain in an upright or pre-determined position when placed in a fluid having a second desired viscosity, different from the first desired viscosity.

5. The device of claim 4, wherein upon placement of both the elongate member and the second elongate member into a liquid in a container, the user is able to identify whether the liquid is of the second desired viscosity, if, after a pre-determined duration, the second elongate member remains in an upright or pre-determined position, and the elongate member falls to the side of the container.

6. The device of claim 1, wherein the elongate member is hollow and comprises an aperture at one or both ends of the member.

7. The device of claim 1, wherein the elongate member is marked or coloured so as to indicate the viscosity or viscosity range of the elongate member.

8. The device of claim 7, wherein the elongate member is marked or coloured in-line with the International Dysphagia Diet Standardisation Initiative (IDDSI) colour level.

9. A device for determining the correct viscosity of a fluid, comprising a plurality of elongate members, each elongate member being able to remain in an upright or pre-determined position when placed in a fluid having a pre-determined viscosity and which is unable to remain in an upright or pre-determined position when the fluid has less than the pre-determined viscosity, and wherein each of the plurality of elongate members corresponds to a different pre-determined viscosity.

10. The device of claim 9, wherein each of the plurality of elongate members has an indicator indicating the pre-determined viscosity of each elongate member.

11. The device of claim 9, wherein each of the plurality of elongate members comprises one or more markings indicative of an upper and lower height of the liquid so as to enable the correct functioning of the device.

12. The device of claim 9, wherein upon placement of two of the elongate members into a liquid in a container, the user is able to identify whether the liquid is of the correct viscosity, if, after a pre-determined duration of time, one of the elongate members remains in an upright or pre-determined position, and another one of the elongate members falls to the side of the container.

13. The device of claim 9, wherein the at least one of the elongate members is hollow and comprises an aperture at one or both ends.

14. The device of claim 9, wherein at least one of the elongate members is marked or coloured so as to indicate the viscosity or viscosity range of the elongate member.

15. The device of claim 14, wherein at least one of the elongate members is marked or coloured in-line with the International Dysphagia Diet Standardisation Initiative (IDDSI) colour level.

16. A method for determining the correct viscosity of a fluid in a container comprising the steps: (a) providing a plurality of elongate members, each elongate member being able to remain in an upright or pre-determined position when placed in a fluid having a pre-determined viscosity and which is unable to remain in an upright or pre-determined position when the fluid has less than the pre-determined viscosity, and wherein each of the plurality of elongate members corresponds to a different pre-determined viscosity; (b) placing two of the elongate members into a fluid in a container; (c) waiting for a pre-determined duration; and (d) determining the correct viscosity of the liquid when one of the elongate members remains in an upright or pre-determined position, and the other one of the elongate members falls to the side of the container.

* * * * *